United States Patent
Rappaport

(10) Patent No.: US 9,722,690 B2
(45) Date of Patent: *Aug. 1, 2017

(54) NETWORK AND NETWORKING METHOD WITH INTELLIGENT BROADBAND WIRELESS RELAY FOR CONNECTIVITY TO MOBILE OR PORTABLE DEVICES

(71) Applicant: Theodore S. Rappaport, Riner, VA (US)

(72) Inventor: Theodore S. Rappaport, Riner, VA (US)

(*) Notice: Subject to any disclaimer, the term of this patent is extended or adjusted under 35 U.S.C. 154(b) by 197 days.

This patent is subject to a terminal disclaimer.

(21) Appl. No.: 14/540,660

(22) Filed: Nov. 13, 2014

(65) Prior Publication Data

US 2015/0063157 A1    Mar. 5, 2015

Related U.S. Application Data

(63) Continuation of application No. 13/676,246, filed on Nov. 14, 2012, now Pat. No. 8,918,049, which is a
(Continued)

(51) Int. Cl.
*H04B 7/155* (2006.01)
*H04B 1/719* (2011.01)
(Continued)

(52) U.S. Cl.
CPC ......... *H04B 7/15542* (2013.01); *H04B 1/719* (2013.01); *H04B 7/1555* (2013.01);
(Continued)

(58) Field of Classification Search
CPC .. H04B 1/719; H04B 7/15521; H04B 7/1555; H04B 7/15557; H04W 4/06;
(Continued)

(56) References Cited

U.S. PATENT DOCUMENTS 4,298,179 A   11/1981   Gilcher
4,626,845 A   12/1986   Ley
(Continued)

FOREIGN PATENT DOCUMENTS

AU      2008222837 A1   9/2008
GB         2476773 A    7/2011
(Continued)

OTHER PUBLICATIONS

E. H. Drucker, "Development and Application of a Cellular Repeater," Proceedings of IEEE Vehicular Technology Conference, Jun. 1988, pp. 321-325.
(Continued)

*Primary Examiner* — Chandrahas Patel
(74) *Attorney, Agent, or Firm* — Whitham, Curtis & Cook, P.C.

(57) ABSTRACT

An ultrawideband radio transceiver/repeater provides a low cost infrastructure solution that merges wireless and wired network devices while providing connection to the plant, flexible repeater capabilities, network security, traffic monitoring and provisioning, and traffic flow control for wired and wireless connectivity of devices or networks. The ultrawideband radio transceiver/repeater can be implemented in discrete, integrated, distributed or embedded forms.

86 Claims, 6 Drawing Sheets

Related U.S. Application Data continuation of application No. 13/157,789, filed on Jun. 10, 2011, now Pat. No. 8,331,854, which is a continuation of application No. 12/689,052, filed on Jan. 18, 2010, now Pat. No. 7,983,613, which is a continuation of application No. 10/919,515, filed on Aug. 17, 2004, now Pat. No. 7,676,194.

(60) Provisional application No. 60/498,324, filed on Aug. 28, 2003, provisional application No. 60/496,913, filed on Aug. 22, 2003.

(51) Int. Cl.

| | | |
|---|---|---|
| *H04W 88/04* | (2009.01) | |
| *H04W 28/02* | (2009.01) | |
| *H04W 28/04* | (2009.01) | |
| *H04W 12/08* | (2009.01) | |
| *H04W 4/06* | (2009.01) | |
| *H04W 24/08* | (2009.01) | |
| *H04W 4/18* | (2009.01) | |
| *H04W 16/14* | (2009.01) | |
| *H04W 24/00* | (2009.01) | |
| *H04W 28/10* | (2009.01) | |
| *H04W 12/12* | (2009.01) | |
| *H04W 12/00* | (2009.01) | |
| *H04W 84/00* | (2009.01) | |
| *H04W 84/18* | (2009.01) | |

(52) U.S. Cl.
CPC ..... *H04B 7/15521* (2013.01); *H04B 7/15557* (2013.01); *H04W 4/06* (2013.01); *H04W 12/08* (2013.01); *H04W 24/08* (2013.01); *H04W 28/0236* (2013.01); *H04W 28/048* (2013.01); *H04W 88/04* (2013.01); *H04W 4/18* (2013.01); *H04W 12/00* (2013.01); *H04W 12/12* (2013.01); *H04W 16/14* (2013.01); *H04W 24/00* (2013.01); *H04W 28/10* (2013.01); *H04W 84/005* (2013.01); *H04W 84/18* (2013.01)

(58) Field of Classification Search
CPC . H04W 12/08; H04W 24/08; H04W 28/0236; H04W 28/048; H04W 88/04; H04W 4/18; H04W 12/00; H04W 12/12; H04W 16/14; H04W 24/00; H04W 28/10; H04W 84/005; H04W 84/18
See application file for complete search history.

(56) References Cited

U.S. PATENT DOCUMENTS

| | | | |
|---|---|---|---|
| 4,659,878 A | 4/1987 | Dinkins | |
| 4,932,049 A | 6/1990 | Lee | |
| 5,012,211 A | 4/1991 | Young et al. | |
| 5,086,506 A | 2/1992 | Hall et al. | |
| 5,592,491 A | 1/1997 | Dinkins | |
| 5,633,876 A | 5/1997 | Dinkins | |
| 5,634,196 A | 5/1997 | Alford | |
| 5,818,821 A | 10/1998 | Schurig | |
| 5,844,905 A | 12/1998 | McKay et al. | |
| 5,898,382 A | 4/1999 | Treatch | |
| 5,974,236 A | 10/1999 | Sherman | |
| 6,110,221 A | 8/2000 | Pai et al. | |
| 6,186,908 B1 | 2/2001 | Kawasaki et al. | |
| 6,272,640 B1 | 8/2001 | Sokol | |
| 6,292,475 B1* | 9/2001 | Swail .................. | H04B 1/713 370/229 |
| 6,348,986 B1 | 2/2002 | Doucet et al. | |
| 6,373,833 B1 | 4/2002 | Suonvieri et al. | |
| 6,418,138 B1* | 7/2002 | Cerf .................... | H04L 12/1886 370/352 |
| 6,466,766 B1 | 10/2002 | Treatch | |
| 6,505,032 B1 | 1/2003 | McCorkle et al. | |
| 6,590,545 B2 | 7/2003 | McCorkle | |
| 6,671,351 B2 | 12/2003 | Menard et al. | |
| 6,718,160 B2 | 4/2004 | Schmutz | |
| 6,741,834 B1 | 5/2004 | Godwin | |
| 6,754,882 B1 | 6/2004 | Sanchez et al. | |
| 6,804,739 B1 | 10/2004 | Young et al. | |
| 6,806,821 B2 | 10/2004 | McLemore | |
| 6,912,212 B1* | 6/2005 | Young ............... | H04W 72/0446 370/337 |
| 6,934,511 B1 | 8/2005 | Lovinggood et al. | |
| 6,937,592 B1* | 8/2005 | Heath, Jr. ............. | H04W 88/06 370/337 |
| 6,952,456 B1 | 10/2005 | Aiello et al. | |
| 7,009,573 B2 | 3/2006 | Hornsby et al. | |
| 7,072,977 B1* | 7/2006 | Bernard .................. | H04L 45/00 455/422.1 |
| 7,289,813 B2 | 10/2007 | Karaoguz | |
| 7,453,837 B2* | 11/2008 | Jiang .................... | H04W 84/08 370/320 |
| 7,599,691 B1* | 10/2009 | Mitchell ................ | G06Q 30/02 455/3.02 |
| 7,676,194 B2 | 3/2010 | Rappaport | |
| 7,787,513 B2 | 8/2010 | Siwiak et al. | |
| 7,945,215 B2 | 5/2011 | Tang | |
| 7,958,041 B2 | 6/2011 | Stanforth et al. | |
| 7,983,613 B2 | 7/2011 | Rappaport | |
| 8,041,627 B2 | 10/2011 | Stanforth et al. | |
| 8,073,458 B2 | 12/2011 | Chang et al. | |
| 8,077,735 B1 | 12/2011 | Unruh | |
| 8,103,798 B2 | 1/2012 | Omura | |
| 8,139,496 B2 | 3/2012 | Stanforth et al. | |
| 8,160,599 B2 | 4/2012 | Stanforth et al. | |
| 8,175,191 B2 | 5/2012 | Tang et al. | |
| 8,175,612 B2 | 5/2012 | Palmer et al. | |
| 8,233,928 B2 | 7/2012 | Stanforth et al. | |
| 8,234,208 B2 | 7/2012 | Stanforth et al. | |
| 8,249,966 B2 | 8/2012 | Stanforth et al. | |
| 8,279,823 B2 | 10/2012 | Stanforth et al. | |
| 8,290,848 B2 | 10/2012 | Duffus et al. | |
| 8,331,854 B2 | 12/2012 | Rappaport | |
| 8,380,194 B2 | 2/2013 | Gossain et al. | |
| 8,406,188 B2 | 3/2013 | Schmidt et al. | |
| 8,457,644 B2 | 6/2013 | Schmidt et al. | |
| 8,483,319 B2 | 7/2013 | Tang | |
| 8,504,087 B2 | 8/2013 | Stanforth et al. | |
| 8,509,706 B2 | 8/2013 | Tang et al. | |
| 8,521,636 B2 | 8/2013 | Chang et al. | |
| 8,526,944 B2 | 9/2013 | Gossain et al. | |
| 8,532,686 B2 | 9/2013 | Schmidt et al. | |
| 8,559,891 B2 | 10/2013 | Tang et al. | |
| 8,576,817 B2 | 11/2013 | Stanforth et al. | |
| 8,577,300 B2 | 11/2013 | Gossain et al. | |
| 8,583,157 B2 | 11/2013 | Stanforth et al. | |
| 8,644,868 B2 | 2/2014 | Gossain et al. | |
| 8,700,077 B2 | 4/2014 | Schmidt et al. | |
| 8,755,830 B2 | 6/2014 | Roberts et al. | |
| 8,792,901 B2 | 7/2014 | Schmidt | |
| 8,804,680 B2 | 8/2014 | Schmidt et al. | |
| 8,824,970 B2 | 9/2014 | Schmidt et al. | |
| 8,831,625 B2 | 9/2014 | Joslyn et al. | |
| 2002/0072357 A1 | 6/2002 | Matsuda | |
| 2002/0093928 A1 | 7/2002 | LoGalbo et al. | |
| 2002/0111137 A1 | 8/2002 | Walkup | |
| 2002/0142767 A1 | 10/2002 | Mears et al. | |
| 2002/0188530 A1 | 12/2002 | Wojcik et al. | |
| 2002/0197990 A1 | 12/2002 | Jochim et al. | |
| 2002/0198977 A1 | 12/2002 | Cho | |
| 2003/0053521 A1 | 3/2003 | Huang et al. | |
| 2003/0063597 A1 | 4/2003 | Suzuki | |
| 2003/0096578 A1 | 5/2003 | McCorkle et al. | |
| 2003/0110157 A1 | 6/2003 | Maki et al. | |
| 2003/0124976 A1 | 7/2003 | Tamaki et al. | |
| 2003/0162504 A1 | 8/2003 | Sabongi et al. | |
| 2003/0162528 A1 | 8/2003 | Juzswik | |
| 2003/0211828 A1 | 11/2003 | Dalgleish et al. | |

(56) References Cited

U.S. PATENT DOCUMENTS

| | | |
|---|---|---|
| 2003/0220075 A1 | 11/2003 | Baker et al. |
| 2004/0010605 A1 | 1/2004 | Furukawa et al. |
| 2004/0017306 A1 | 1/2004 | Miao |
| 2004/0142680 A1 | 7/2004 | Jackson et al. |
| 2004/0146092 A1 | 7/2004 | Balakrishnan |
| 2004/0157550 A1 | 8/2004 | Nakagawa |
| 2004/0166802 A1 | 8/2004 | McKay et al. |
| 2004/0178928 A1 | 9/2004 | Butzer et al. |
| 2004/0178942 A1 | 9/2004 | McLemore |
| 2004/0190594 A1 | 9/2004 | Santhoff |
| 2004/0198260 A1 | 10/2004 | Molisch et al. |
| 2004/0212537 A1 | 10/2004 | Mohammadian |
| 2004/0259494 A1 | 12/2004 | Mazar |
| 2005/0018640 A1 | 1/2005 | Fullerton et al. |
| 2005/0026563 A1 | 2/2005 | Leeper et al. |
| 2005/0026661 A1 | 2/2005 | Rheenen et al. |
| 2005/0197121 A1 | 9/2005 | Fujiwara et al. |
| 2005/0208889 A1 | 9/2005 | Baker et al. |
| 2006/0063484 A1 | 3/2006 | Proctor et al. |
| 2006/0071776 A1 | 4/2006 | White et al. |
| 2006/0106961 A1 | 5/2006 | Ebata et al. |
| 2006/0251148 A1 | 11/2006 | Welborn et al. |
| 2006/0285577 A1 | 12/2006 | Santhoff et al. |
| 2008/0065416 A1 | 3/2008 | Mazar et al. |
| 2008/0107162 A1 | 5/2008 | Moore et al. |
| 2008/0136644 A1 | 6/2008 | McCorkle |
| 2012/0033714 A1 | 2/2012 | Lakkis et al. |

FOREIGN PATENT DOCUMENTS

| | | |
|---|---|---|
| GB | 2483183 A | 2/2012 |
| GB | 2491319 A | 11/2012 |
| JP | 5208138 B2 | 6/2013 |
| JP | 5576521 B2 | 8/2014 |

OTHER PUBLICATIONS

W.T. Slingsby, et al., "A high-gain cell enhancer," IEEE Vehicular Technology Conference Proceedings, May 1992, pp. 756-758, vol. 1, http://research-information.bristol.ac.uk/files/2999289/slingsby_IEEE_VTC_1992.pdf.

A. Zegar, "Adaptive antenna same frequency repeater," IEEE APS Intl. Symp, Oct. 1976, pp. 452-455.

T. M. Cover, et al., "Capacity theorems for the relay channel," IEEE Trans. Inform. Theory, Sep. 1979, pp. 572-584.

A. Sendonaris, et al., "Increasing uplink capacity via user cooperation diversity," Proc. IEEE Int. Symp. Information Theory (ISIT), Aug. 1998, p. 156, Cambridge, MA.

L. Zheng, et al., "Diversity and freedom: A fundamental tradeoff in multiple antenna channels," in Proc. IEEE Int. Symp. Information Theory (ISIT), Jun./Jul. 2002, p. 476, Lausanne, Switzerland.

L. Zheng, et al., "Diversity and multiplexing: A fundamental tradeoff in multiple-antenna channels," IEEE Trans. Inform. Theory, May 2003, pp. 1073-1096, vol. 49.

L. H. Ozarow, et al., "Information theoretic considerations for cellular mobile radio," IEEE Trans. Veh. Technology, May 1994, pp. 359-378, vol. 43.

E. C. Van Der Meulen, "Three-terminal communication channels," Adv. Appl. Probab., 1971, pp. 120-154, vol. 3.

J. N. Laneman, et al., "Cooperative Diversity in Wireless Networks: Efficient Protocols and Outage Behavior," IEEE Transactions on Inform. Theory, Dec. 2004, pp. 3062-3080, vol. 50, No. 12.

H. Hu, et al., "Range Extension without Capacity Penalty in Cellular Networks with Digital Fixed Relays", Proceedings of IEEE Global Telecommunications Conference, Nov./Dec. 2004, pp. 3053-3057, Dallas, TX.

"BellSouth Tests In-Building Service Using its Cellularone Network,,,In-Building Services Time Has Come . . . Panasonic Enters PCS Product Market Early", Mobile Phone News, Feb. 21, 1994.

Buehrer et al., "Range Extension for UWB Communications", White Paper, Virginia Tech, May 30, 2002.

Jones, "WiDeFi Repeats History", Unstrung, Apr. 9, 2004, (www.unstrung.com/document.asp?ocid=50796).

Intel Technology Journal, vol. 7, No. 3, Aug. 2003.

"Pick Your Wireless Solution", publication and source/author unknown.

Fontana, "Recent Applications of Ultra Wideband Radar and Communications Systems", To be Published in Ultra-Wideband, Wideband, Short-Pulse Electromagnetics.

Kumar, "802.15.3 MAC Layer Overview and Proposed Enhancements to Support UWB PHY", Virginia Tech MPRG.

Ahmed et al., "High-Tech Uweeba (UWB)—From Bandwidth to Bucks? Part 1", www.thechilli.com, Aug. 24, 2003.

"New Technology Bulletin", vol. 1, No. 7. Mar. 2001.

Withington, "Time Modulated Ultra-Wideband", Federal Wireless Users Forum, May 2001.

Cringeley, "Good News", www.pbs.org/cringeley/pulpit (The Pulpit), Aug. 8, 2002.

WiDeFi Products Webpage, www.widefi.com/products.

Tim, "New Products: Buffalo Tech Announces 11g Bridge/Repeater", smallnetbuilder.com, Jun. 17, 2003.

Tim, "SMC Intros 11b AP, Repeater, Bridge", smallnetbuilder.com, Jun. 10, 2003.

"Propagator Fully Integrated Repeater", www.andrew.com/products.

"Ultrawideband.ca Mesh Networking Explained", 2003.

Intel Technology Journal, "Wireless Technologies", vol. 7, No. 3, Aug. 19, 2003, ISSN-864X.

"Pick Your Wireless Solution", White Paper, University of Texas at Austin IT Staff, May 2002.

Fontana, "Recent Applications of Ultra Wideband Radar and Communications Systems", Ultra-Wideband, Short-Pulse Electromagnetics, 2002.

Kumar, "802.15.3MAC Layer Overview and Proposed Enhancements to Support UWB PHY", Virginia Tech, May 2004, http://scholar.lib.vt.edu/theses/index.html.

Kumar, "MAC and Physical Layer Design for Ultra-Wideband Communications", Virginia Tech, May 2004, http://scholar.lib.vt.edu/theses/available/etd-05172004-123657/unrestricted/ThesisNishantKumar.pdf.

\* cited by examiner

NETWORK AND NETWORKING METHOD WITH INTELLIGENT BROADBAND WIRELESS RELAY FOR CONNECTIVITY TO MOBILE OR PORTABLE DEVICES

CROSS-REFERENCE TO RELATED APPLICATIONS

This application is a continuation application of U.S. Ser. No. 13/676,246 filed Nov. 14, 2012, which is a continuation of U.S. Ser. No. 13/157,789 filed Jun. 10, 2011, now U.S. Pat. No. 8,331,854, which is a continuation of U.S. Ser. No. 12/689,052 filed Jan. 18, 2010, now U.S. Pat. No. 7,983,613, which is a continuation of U.S. Ser. No. 10/919,515 filed Aug. 17, 2004, now U.S. Pat. No. 7,676,194, and claims priority to U.S. Provisional Application 60/496,913 filed Aug. 22, 2003, and U.S. Provisional Application 60/498,324 filed Aug. 28, 2003, and the complete contents of both provisional applications are herein incorporated by reference.

BACKGROUND OF THE INVENTION

Field of the Invention

The present invention generally relates to electronic signal and data repeaters and, more particularly, to a repeater to be used in conjunction with ultrawideband technologies.

Background Description

In the coming years, ultrawideband (UWB) transmission technologies will dominate high data rate communications in the last 10-1000 meters of wireless/portable access to a telecommunications grid. With the huge data rates and position location capabilities afforded by UWB, offices, homes, and small environments such as doctors offices, vehicles, or small buildings will rely on UWB communication devices for connections between consumer electronic devices and computer devices.

As UWB devices proliferate, it will be possible to provide immense data rates, at burst rates up to 480 Megabits per second and even greater, in order to create a wireless Universal Serial Bus (USB) capability or home/enterprise networking capability. This will allow cameras, cellphones, computers, and computer and home entertainment and video systems to have very good and fast data rate transmissions in small (say 10 to 50 feet or greater) distances. The great data rates of UWB will open up an entire new world of high speed personal area networks which currently does not exist. Companies such as Time Domain, Xtreme Spectrum Inc, Motorola, Intel and Texas Instruments, are likely to be leading manufacturers or developers of products for UWB communications.

In typical doctors offices, homes, apartment buildings, and large warehouses and store rooms, etc, today there are Wireless (WiFi) access points that can be connected to the ethernet backbone in order to provide WLAN access and internet access to computer platforms. The backbone medium is typically Cat-3 or Cat-5 cabling that has 10baseT, 100baseT or 1 GHz ethernet signaling, and higher. In the future, this backbone may be wireless, for example, where cable companies or telephone/wireless/internet service providers may use mesh networks, WiMax, or last mile MIMO modem devices that bring broadband video, audio, and data/internet traffic to homes from lampposts or street corners. Satellite radio and fiber cable are also viable methods of delivering the backbone plant to buildings and cars.

Today, the expense of the WiFi access points is on the order of one to several hundred dollars when the hardware and installation is factored in. These access points provide the ability of multiple WLAN users (typically computer or PDA users) to gain portable access the Internet, and hot spots such as those implemented by Schlotzskys Deli and Starbucks are becoming popular throughout the world. However, these WiFi access points are made to allow users to access the Internet, which is a different use and approach than is likely to emerge with UWB networks, which connect devices together in close-in networks.

Ultrawideband technologies are about to become mainstream, and are described in US patent application 20030096578, published May 22, 2003, by John McCorkle, et. al. of Xtreme Spectrum, Inc., U.S. Pat. No. 6,505,032 (the patent publication and U.S. patent being herein incorporated by reference), as well as in "Recent Applications of Ultra Wideband Radar and Communications Systems", by Robert Fonatna of Multispectral Solutions, Inc. The IEEE 802.15.3 standards bodies have been developing Physical (PHY) and MAC layer standards for dynamic channel selection and repeater service for UWB, which falls under the general IEEE 802.15.3 standards body.

As explained in the powerpoint presentation by Nishant Kumar, of Virginia Tech's MPRG, as well as in the IEEE standards proceedings, the IEEE 802.15.3 MAC operation provides for repeater service request and repeater service grant commands. Devices use passive scanning to listen for beacon frames or for any nearby user device. If there are not nearby devices which are radiating, a device may establish its own piconet. There are a number of frame and superframe structures, and subsections which permit various types of access, such as contention based schemes using, for example, carrier sense multiple access (CSMA), as well as guaranteed time slots for asynchronous or isochoronous data streams and management time slots.

While the MAC standard suggests repeater service to be used by IEEE 802.15.3 devices when the links between devices are not satisfactory, these types of links can only be established if there is sufficient time available in the channel seen by one of the devices which is involved in the repeating operation. As proliferation of UWB devices is likely to be rapid, there is likely to be contention such that the current mode of MAC repeater operation, envisioned by the presently proposed 802.15.3 standard, is not adequate to provide one or more of sufficient security, proper traffic filtering, bandwidth provisioning, network management features, or flexibility of networks that can be installed or controlled easily by a consumer. That is to say, the current repeater operation contemplated by 802.15.3 and proposed UWB devices is based on the assumption that a single chip can perform necessary repeater functions, but this functionality alone will not be adequate for the rapid emergence of UWB and the onslaught of wireless data that is certain to occur.

Currently, IEEE 802.15.3a, the Ultrawideband Physical Layer standard committee, is working on creating a standard that may either be Multiband OFDM transmission (MBOA), with 500 MHz channels, or a Direct Sequence Spread Spectrum impulse radio standard that has broader channel bandwidths (UWB Forum). Ratification of one or both of these standards may occur by the end of 2004, as described in a recent paper submitted to High Frequency Electronics, coauthored by the present inventor.

The High-Tech article by Woz Ahmed and Bipin Parmar (the Chilli) provides a glimpse at the various activities in the Ultrawideband standard bodies. Ultra-Wideband Technology was also discussed in the New Technology Bulletin in March 2001, Vol. 1, Issue 7, before the multiband OFDM proposal was created. In fact, Time Domain's Paul Withington presented the talk "Time Modulated Ultra-Wideband" to the Federal Wireless User's Forum in May 2001. As described by Robert X. Cringely in his Aug. 8, 2002 article, "Good News!", it was mentioned that Xtreme Spectrum had already produced a working UWB chip capable of 100 megabits per second over 10 meters, and the article further explained the idea of mesh networking, which will provide efficient network paths that allow very high data rates across the internet for remote downloading of files.

In "Ultrawideband.ca Mesh Networking Explained", Ultrawideband.ca explains they have software that allows a user to install, on their PC, a MeshBoot disk which attempts to find internet gateways at particular Internet Protocol addresses using a DHCP client. If no gateway can be found, the software causes the users' PC to simply serve as a wireless repeater-cell. This type of operation is controlled by the software on the CD, and requires installation by the user. In future years, there are parallels that can be drawn between some of the features and functionality in the MeshBoot software for Internet use, and the capabilities that will be required to be embedded in network hardware, rather than provided on a CD for installation on PCs, in order to support massive amounts of traffic in and around homes and offices (Rather than on the world-wide web or internet).

Repeaters are well known in the art, and they have been manufactured for decades in the cellular and PCS industries, and more recently, a company in Melbourne Fla., WiDeFi has developed WiFi repeaters for the IEEE 802.11a/b marketplace (See WiDeFi web pages describing their patent pending designs for range and bridge extension for Wireless LAN standards). Buffalo Technology announced a bridge and repeater product for IEEE 802.11g wireless LAN WiFi standard on Jun. 17, 2003 (See SmallNet Builder website page), and indicated that its repeater provides point-to-point or 6 station point-to-multi-point operation. Buffalo indicated it had security features such as WiFi Protected Access (WPA), WEP, Password protection, and MAC address association control. It uses a brower based interface for configuration, and has a 10/100 Ethernet LAN connection port, and sells for the suggested price of $149. SMC Networks introduced, on Jun. 6, 2003, its SMC2671W 2.4 GHzGHz 11 Mbps Wireless Ethernet Adapater, which provides an interface between the wired internet backbone and the wireless LAN network. It also has wireless repeater capabilities for WLAN range extension, and has both Ad-Hoc (peer-to-peer) and Infrastructure (client to AP) operating modes, WEP encryption, WPA, MAC Address filtering, and SSID Broadcast Disable. It uses a web browser or Window-based administration software for configuration. Andrew Corporation makes classic PCS/Cellular repeaters, such as the fully integrated PROPAGATOR repeater shown on its webpage. The repeater uses standard 110 VAC power and has a single package for all signal processing components. Qualcomm has recently developed repeater technology for CDMA.

SUMMARY OF THE INVENTION

This document describes a new type of wireless network device that will be required as wideband UWB devices proliferate rapidly. In anticipation of the increased traffic, ubiquity, security and bandwidth provisioning needs of future UWB devices, we disclose a low cost repeater/transceiver that is tailored for easy and rapid deployment to facilitate the interconnection of network devices using ultra-wideband radio, which will likely be standardized by or before 2005. Ultrawideband is meant here to be any type of electromagnetic signals that have an instantaneous or overall occupied bandwidth of 100 MHz or more and that are used to communicate or to position-locate between 2 or more devices. Such wide bandwidths, when considered to have the same RF power transmitter levels as today's wireless devices, require receivers to be within much closer propagation distances than conventional cellular/PCS and WiFi networks, due to the fundamentals of the Power-Bandwidth product. That is, for a given RF transmit power level, a larger passband (e.g. RF channel) bandwidth generally implies a proportionally higher noise floor power level, which requires UWB devices generally to be physically closer in distant to each other in order to obtain a sufficiently strong signal to noise ratio (SNR) when compared to equal power devices with smaller passband bandwidths. Thus, repeaters will become necessary to connect devices over greater distances than the range of a single UWB device.

UWB adoption is likely to be rapid, and just as spam email occurs today with increased frequency on the internet, wireless UWB devices will be subject to tremendous and increased amount of interference, spam traffic, and RF interferences, as well as security attacks by rouge or spoofed message sources or unwanted transmitters. Proper repeater functionality will require the ability to detect and process such unwanted traffic in a personal or local area network, as well as to report back attempted breaches of security or interference sources to a network controller or host device which is connected to the internet (for example, the home computer, the media center, game console, or a remotely located server or security server that may be in a different neighborhood or city but which is connected via Internet). The need to properly process, filter, ensure security, and provide sufficient or prioritized bandwidth will also emerge because of future wireless networks that will allow devices in the home or office to remain connected to the outdoor wireless network through roaming systems and protocols, as proposed by Dong-Ho Cho in US Patent Application 2002 0198977 Published Dec. 26, 2002, and other networks such as those described by Rappaport in "Wireless Communications: Principles and Practice", 2/e, c. 2002 and the invited $50^{th}$ anniversary paper by Rappaport, et. al., Wireless Communications: Past Events and Future Perspectives, June 2002, IEEE Communications Magazine.

In future UWB applications in the home or office, it is likely that only one or two devices, such as a computer, a server, or a television set or game console, will need to be connected to the ethernet/internet backbone (the plant that comes in to the home or office or car, etc.), while many other devices, such as home entertainment systems, telephones, portable computers, video monitors, and display/video/audio/entertainment devices in the home or office will be untethered within the same room or within several tens of meters of these "fixed" or stationary internet-connected devices. Of course, these fixed devices connected to the plant may also be portable or mobile, in fact, as wireless proliferates. In hospitals, hotels, or homes and offices and businesses, the UWB technologies will open up an entirely new way of communicating high data rates, and will create entirely new architectures for communications within small spaces (e.g, homes, apartment buildings, cars, stores, offices, etc.). In vehicles, trains, aircraft, and other moving platforms, one can envision a single or a few main devices connected to an outside wireless internet connection, while in the vehicle itself, piconets will be formed between UWB devices.

The invention described here is a low cost ultrawideband repeater device, which allows a home or office user to rapidly deploy a repeater which can extend the range of these UWB piconets, so that a home or business owner does not have to install wiring such as Cat-5 cable throughout an office or home. Instead of wires which carry the internet traffic from today's cable or T1 or DSL jack to a particular device, the UWB repeater invented here will allow just one or a handful of internet-connected devices to serve as the "internet source" for a local wireless network, and the disclosed invention will better enable that "source" to serve as the local hub or access point for a whole host of portable or fixed UWB devices in a home or office.

It is thus the goals of the present invention to meet at least some or all of the following objectives, which are specified subsequently in this application:

It is an object of the invention to provide a method and system that allows the Internet, Cable TV, satellite, telephone, or other communications sources to be connected from the external wired or wireless plant and distributed by UWB radio within an indoor or in-vehicle environment.

It is yet another object of the invention to provide a method and system that enables ultrawideband radio signals to be repeated by a UWB radio device within an indoor or in-vehicle environment.

It is yet another object of the invention to provide a method and system that enables ultrawideband radio signals and baseband signals carried on wires to be connected together in a single device, while allowing UWB radio signals to be repeated in the RF spectrum and baseband signals to be routed on wires within an indoor or in-vehicle environment.

It is yet another object of the invention to provide a method and system that provides the selective screening of data received over UWB radio or baseband, where such selective screening of data is based upon the received UWB data or upon preprogrammed control instructions provided by the desired network or from a desired source.

It is yet another object of the invention to provide a method and system that provides the selective screening of data received over UWB radio or baseband, where such selective screening of data is based upon the received UWB data or upon preprogrammed control instructions provided by the desired network or from a desired source.

It is yet another object of the invention to provide a method and system that provides the selective screening of data received over UWB radio or baseband, where such selective screening of data ignores, rejects, or kills received UWB data that is from undesired networks or from undesired sources.

It is yet another object of the invention to provide a method and system that provides the selective modification of data received over UWB radio or baseband, and provides said modified data for retransmission on UWB radio frequencies, or for storage.

It is yet another object of the invention to provide a method and system that ignores, rejects, or kills received UWB data that is from undesired networks or from undesired sources.

It is yet another object of the invention to provide a method and system that provides selective and adaptive priorities on UWB messages that are to be repeated or stored.

It is yet another object of the invention to provide a method and system of monitoring network traffic statistics over a UWB network, and to report such statistics to a central host controlling unit or to the plant.

It is yet another object of the invention to provide a method and system of maintaining a UWB network, through the periodic reporting of traffic conditions, user numbers, user locations, statistics, interference levels, and IDs observed.

It is yet another object of the invention to provide a method and system that provides for flexible and adaptive data processing for real time detection, flexible transmission rates, different PHY and MAC implementations, adaptive ID or watermark transmissions, transmissions pertaining to network quality, network activity, or security breaches, position location transmissions, or repeat or beacon transmission at preset intervals.

It is yet another object of the invention to provide a method and system that provides an adaptive UWB radio interface, depending on the priority of the message, or the instantaneous radio channel conditions, interference conditions, or undesired traffic in the network.

It is yet another object of the invention to provide a method and system that provides for the use of adaptable, steerable, electronic phasing, or MIMO (multiple-input multiple-output) antennas with UWB networks to improve wireless network performance.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
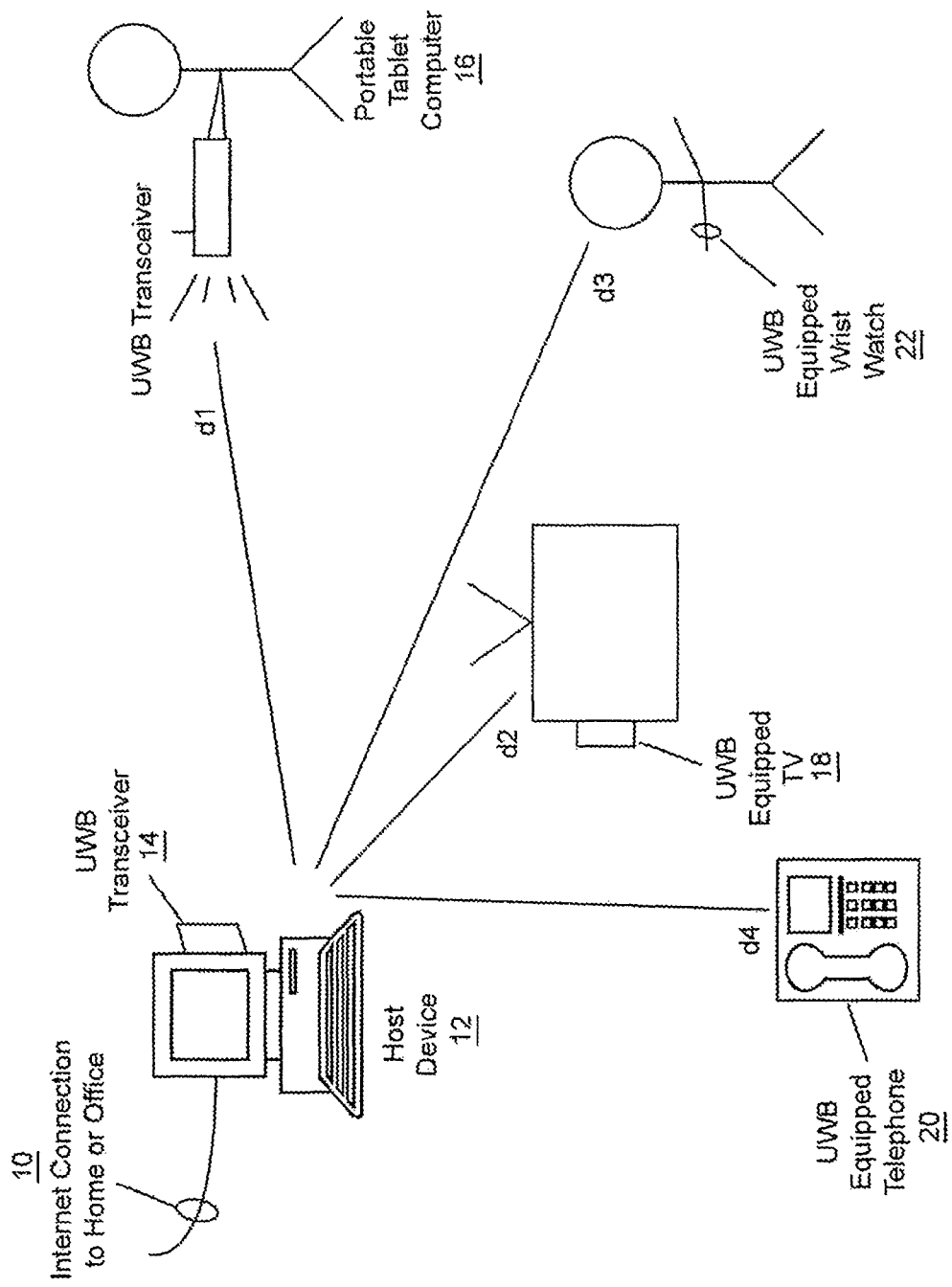
FIG. 1 illustrates a Personal Area Network in a home, business, vehicle, or some other personal environment consisting of a host device and a number of portable devices, each equipped with UWB technology.

The Ultrawideband repeater disclosed here serves to "repeat" data signals coming from one or many devices so that other devices, located farther away from the "source" will be able to access the internet, Cable TV, Satellite source, phone/DSL line, or other broadband "plant" source via the repeater. This will obviate the need for any wiring whatsoever in homes and offices, and will enable rapid deployment of networks that perform properly and adapt to traffic loading, spam, interference, and desired characteristics of the plant provider of the network owner (e.g. home owner, enterprise owner, vehicle owner). The repeater will provide for additional coverage and will enable high data rate channels to work in confined environments more efficiently and more reliably than stock UWB equipment currently being offered by the marketplace. The invention here offers advantages, flexibility, and improved performance and security than the currently proposed IEEE 802.15.3 activities which call for "repeater service" as part of the MAC definition.

The disclosed Ultrawideband repeater has the additional important and novel capabilities of being able to filter and process data, and to provide for the storage, processing, and forwarding of received data at the input, and also allows for the suppression or "killing" of data that is not part of the desired network or which may be from undesired users, spammers, or interference sources. Also, the ability of the device to prioritize traffic access and flows, based on application requirements, make this invention a powerful device used to enable high bandwidth personal area networks, where a number of wireless devices in a home or office or car all share the same UWB spectrum without requiring wiring, but which may have different real time requirements, different priorities and bandwidth requirements, and different security requirements. Thus, the intelligence of the repeater, afforded by processing, storage, and antenna/RF control is a marked improvement over what is currently contemplated or known.

The invention differs from prior art because, among a number of reasons, of the much greater bandwidth of UWB compared with current wireless devices, and the presently unforeseen challenges and unmet solutions that UWB will encounter because of the massive amounts of wireless traffic that will occur. The invented repeater and associated architecture solves a critical and unmet need for future high speed UWB networks, and provides needed network coverage, performance, security, filtering, addressability, configuration, and connectivity for a home or business or vehicle personal area network. The invention provides needed network infrastructure to provide coverage where only one or a few sources can be linked to the ethernet or another telecommunications backbone (e.g., a central server/hub, or a "plant", which may be an optical cable source, RF, coax, baseband, satellite signaling, etc.) At the same time, the disclosed invention provides embedded security and traffic intelligence, and the ability to interpret, modify, and selectively filter wireless traffic for the benefit of the network user. In addition, the disclosed invention works with both wireless UWB transmissions, as well as with standard baseband wiring-types of data transmissions, allowing the invention to be addressable by and responsive to wired networks as well as the wireless networks. In fact, the present invention allows for the fusing of wireless and wired network components so that they may be commingled and served by a single plant or server, within the same network. Thus, the invention facilitates new capabilities in connecting UWB equipped devices through a repeater operation for many other devices that may exist in a room or office or building or vehicle. In this way, for example, a doctor's office complex would only need to have a single computer, say the receptionist's desk computer or a media center, which might be connected to the internet, cable TV, copper line, or satellite station, and this single computer could serve as the host computer or server to the office network. If this receptionist's desk computer or a media center is equipped with a UWB radio, and all other devices, for example, portable computers, pen tablets, gaming devices, video monitors, or Voice over IP portable communicator devices used in the office, were configured to be on the same network (piconet) as this desk computer, then our invention would allow coverage and data transmission throughout the entire office complex, rather than being limited in range to 10 or 20 feet as would be the case for a single point-to-point communication between 2 UWB devices. Wired network devices could also be connected and served on the same network, serviced by the same plant, using the disclosed invention. Also, at the same time, the described invention provides a low cost way of providing massive data transfers, with bandwidth prioritization and security, network monitoring, and "network learning" and spam filtering not currently available in today's wireless devices. Thus, the invention helps improve and facilitate wireless high speed networking, for both mobile/portable and fixed applications, in environments such as stores, homes, apartments, cars, and factories, etc. where broadband data communications between devices, and access to the plant by several networked devices is necessary.

FIG. 1 shows the internet connection 10 coming into the home or office, which may be data only, or analog voice and data, where this "backbone" connection may be provided using wires or fiber (such as T1, T3, DSL, cable, cable modem, OC3, etc.) or wireless (last mile wireless service, mesh networks, LMDS, MMDS, WiMax, Satellite, 802.16, 802.20, 802.11a/b/g, or some other wireless distribution mechanism, such as 802.15.3.a, etc.). Once in the home or office (or vehicle, etc.), a host device 12, such as personal computer or server, or building router (a personal computer, as an example, is shown in FIG. 1) is connected to the backbone. The host device 12 is further equipped with a UWB transceiver 14, which may be integrated, stand alone, plug-in, or part of a multi-band, multi-mode radio that is either discrete or embedded within a microprocessor chip, or which is connected to, attachable to, insertable into, or integrated within the host device. Plug-in cards, discrete components, embedded devices and other such embodiments are contemplated. Once connected to the backbone internet and the UWB transceiver 14, the host device 12 is able to facilitate communication to other UWB devices in the home or office. For example, in FIG. 1, provided that the distance is short enough and the local interference is low enough, it is possible for the UWB Transceiver on the host device to support meaningful communications to a UWB-equipped Portable Table computer 16, a UWB-equipped television set 18, a UWB-equipped telephone 20, and even a UWB-equipped wrist watch 22, as examples but not limitations to viable uses of UWB wireless technology for personal area networks. As explained in the prior art, UWB possess sufficiently high bandwidth that new services, such as ranging or position location are easily incorporated with high speed communications, and the current invention considers supporting the myriad of applications and implementations of UWB devices. Using the standards proposed in the IEEE 802.15.3 committees, it is known that it would be possible to configure Personal Area Networks such as shown in FIG. 1 using UWB, all without wiring up the local area.

Note, however, from FIG. 1, that the distances (d1, d2, d3, d4) between devices vary, and the local environment may have walls or metal partitions that cause signals to decay or fade (not shown). Thus, it is possible that the host device 12, which is typically (but not necessarily) fixed, may not be close enough to all locations where portable users of the UWB network which to operate from at a particular instant of time. Furthermore, since the signal power falls off with distance, UWB transceivers that are further away from the host 12 will be more susceptible to interference from undesired users or noise sources (not shown), and will also be more susceptible to security breaches or spam attacks by undesired transmitters (not shown). Battery life of portable devices will also be shorter for those which have to provide sufficient bandwidths over longer distances (higher power consumption).

Figure 2:
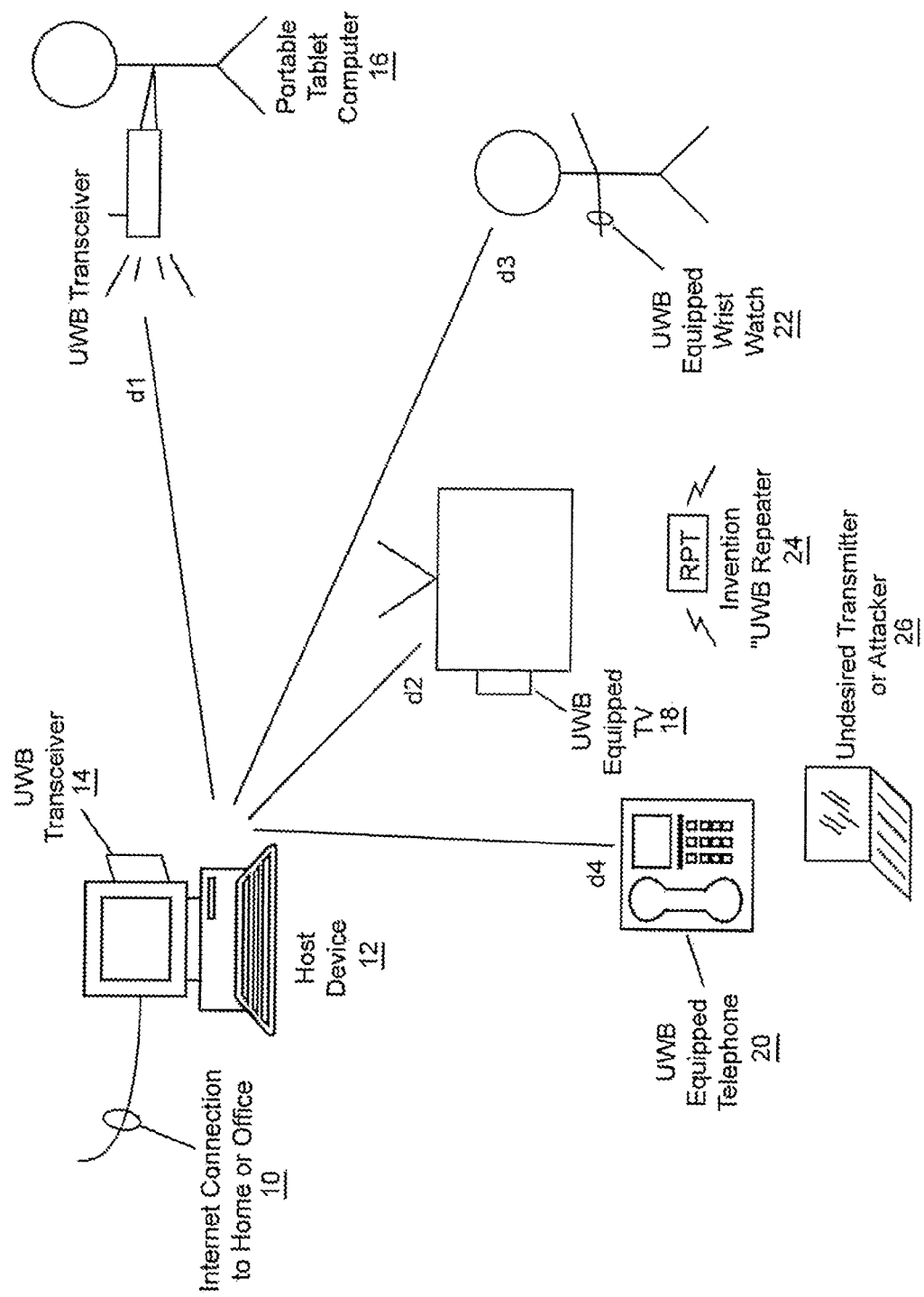
FIG. 2 illustrates a Personal Area Network in a close-in space, consisting of a host device, a number of portable devices, all equipped with UWB technology, and the disclosed UWB repeater invention, as well as an undesired neighboring transmitter.

Now consider FIG. 2, where the same UWB network of FIG. 1 now contains the invention, the UWB Repeater 24. With placement of the UWB repeater 24, the distances between the host 12 and the repeater 24 are shorter than the distances between the host and other users. Thus, the repeater is able to provide the ability to extend range to outlying users, which will be important to maintain high data rates in interference or crowded spectral situations. Furthermore, the repeater 24 is also able to receive the transmissions from the undesired transmitter, and may be equipped to ignore the undesired transmission, as well as instruct other users of the network to ignore the undesired transmission, thus improving personal area network performance. With the invention used in the Personal Area Network, battery life of portable devices may be extended, as well.

The repeater 24 of FIG. 2, in order to work properly, requires careful signal processing that is able to null out noise and interference across the very wide bandwidth used by UWB (such as noise from an undesired transmitter or attacker 26). In addition, the repeater must provide significant isolation between the input and the output, typically 40 to 50 dB minimum and more if possible, in order to prevent oscillation and feed forward interference. A wide range of techniques to perform such electrical performance are well understood by those skilled in the art of RF circuit and filter design. In addition, the UWB repeater 24 must faithfully retransmit both the forward and reverse paths of a two way communication, and must provide uniform/even group delay across most, if not all, the occupied bandwidth of UWB.

Figure 3:
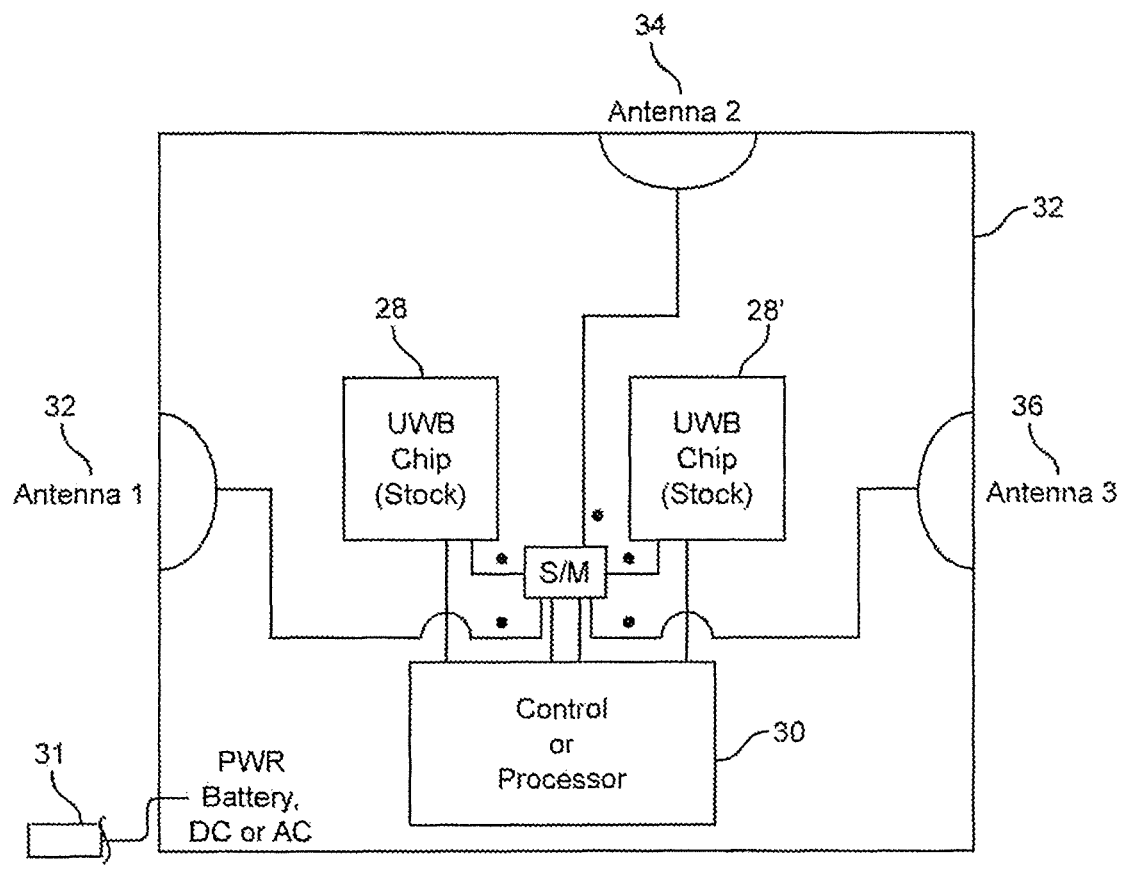
FIG. 3 illustrates a block diagram of the UWB repeater.

As shown in FIG. 3, to possibly achieve fastest time to market, would be to implement this invention by using two UWB chips or devices 28 and 28'. These may be standard UWB modem devices, with sufficiently fast controlling and memory circuitry that creates a data bridge 30 between the two UWB chips. These two chips, and the controlling/memory circuitry bridge 30, are built and encapsulated in a housing or chamber 32 which has good electromagnetic isolation between the input side (the side in which signals needing to be repeated are entering) and the output side (the side in which signals that are being repeated are regenerated and reradiated). Power (either AC or DC) from a source 31 for the repeater can be provided from a battery or an outlet. Also, an RF switch for switching/processing antennas may be integrated in the controller circuitry, or may be a separate, discrete component or series of components, such as a butler matrix circuit, simple RF single-pull multiple-throw, or phase shifter network for phased array antennas, or a wide range of well known antenna switching or phasing/processing mechanisms. While FIG. 3 shows a preferred embodiment, it should be clear that the entire assembly could be implemented in a different manner, for example using mixed-signal circuitry and included on a single chip, or a hybrid chip could be used and packaged as a single device, or discrete RF/baseband ICs could be developed and used. The ability to control RF antenna signals, coupled with baseband processing, would allow many well known Multiple Input Multiple Output (MIMO) antenna technologies to be used to improve link quality. It also should be clear that each of the antennas (32, 34, and 36 shown in FIG. 3, and 38 and 40 shown in FIG. 4) may be a single antenna, multiple antennas, antenna arrays, and may take on many different physical forms.

Each physical side of the UWB repeater invention may at one time serve as the input and another time serve as the output, as the invention offers simplex, half duplex, or full duplex capability. It should be understood that each side of the invention could itself use MIMO antennas or phased/steerable antennas. Similarly, the forward or reverse signal path may use either side of the UWB repeater. Antennas, such as those developed by Prof. Hao Ling at the WNCG at University of Texas, and by Warren Stutzman of Virginia Tech, allow wideband UWB transmissions with some directionality, and these are easily sprayed on or built from metal stock using metallic film on plastic cases. Dielectric antennas, or antennas with inherent notching capabilities, may also be incorporated as is known in the prior art. The directionality helps with isolation between the input and output of the repeater. Further, the repeater may use multiple antennas, in a sector arrangement, that can automatically be sensed and switched by the UWB devices and/or the controller circuitry, in order to focus energy in directions of where devices needing to be transmitted through the repeater are located. This could be used on both or either transmit or receive operations. A wideband RF switch, which may be a MEMS device such as contemplated by Hughes Electronics or Teravicta of Austin, Tex., is part of the circuitry contained within the repeater, so that various antenna selections are made. Alternately, RF switches can be avoided and RF processing may be used to provide Maximum Ratio Combining, Linear Combining, Equal Weight Combining, or MIMO implementations, all which are well understood by those skilled in the art, may be made. Other low-cost RF switches could be employed, as well, for antenna phasing/steering and selection, and the switch could actually be incorporated in future UWB chipsets or other integrated circuitry in various ways known now and in the future.

Figure 4:
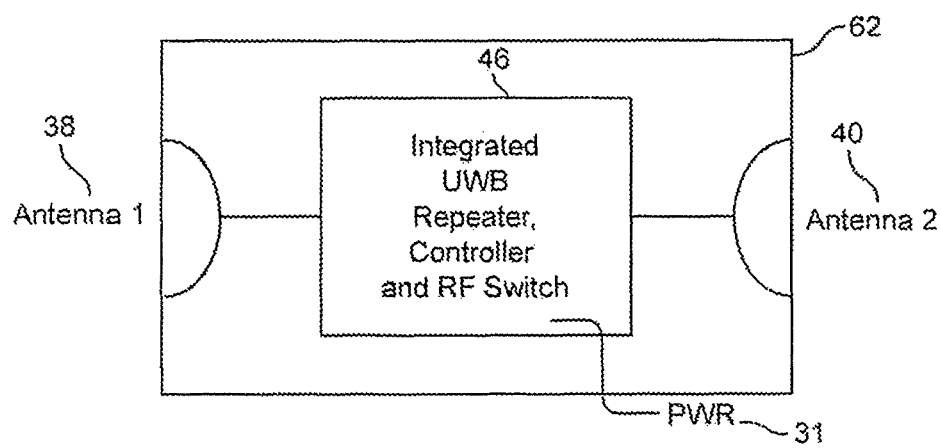
FIG. 4 illustrates another embodiment of the UWB repeater, using a more integrated approach with more reliance upon signal processing and software.

As shown in FIG. 4, an alternative approach to creating the UWB repeater invention, rather than using two stock UWB devices with some additional control and memory logic for data processing, signal processing, and antenna switching or diversity/beam forming, would be to use a true bent-pipe repeater approach, where all signals at the input are simply re-radiated at the output. Note that the very wide bandwidths involved with UWB make this approach more difficult today, yet viable in a low noise environment that does not have swamping. Even in higher noise environments, DSP noise cancellation and wideband compensation such as phase linear processing, and careful isolation and compensation across the wideband spectrum could be employed. This type of DSP processing will be available in reasonably low cost platforms within the next several years.

Alternatively, FIG. 4 represents an application specific integrated circuit 42 made of Si, SiGe, GaAs, or other known materials either within a chip, a system on a chip, or discrete circuitry, could be fabricated to implement an integrated repeater with processing circuits for data processing that provides network security and data buffering as well as desired bandwidth provisioning for different applications passing through the repeater. Clearly, an integrated antenna would be a less expensive per-part product price, once the design was perfected, and a single antenna repeater with near omni-directional radiation pattern offers lower costs to manufacture, and would be more preferable for generic in-home or office use. As noted in FIG. 3, power (either AC or DC) can be provided by a source 31, such as a batter or outlet.

Note that instead of using multiple antennas and having two "sides" (an input and an output) as shown in FIG. 4, the UWB repeater could instead use a single antenna, and could use a vast memory (either onboard in chip or external to the RF or processing circuitry) to simply buffer and retransmit the received data. This would induce a greater delay in the repeated signal, but would provide a less expensive form factor, due to fewer antennas, would offer smaller size, and would save costs due to the lack of expense incurred with an RF switch for the antennas. In addition, a store and forward approach embodiment such as contemplated in this paragraph would remove isolation concerns that provide design challenges in bent-pipe or simultaneous receive/transmit repeaters.

Figure 5:
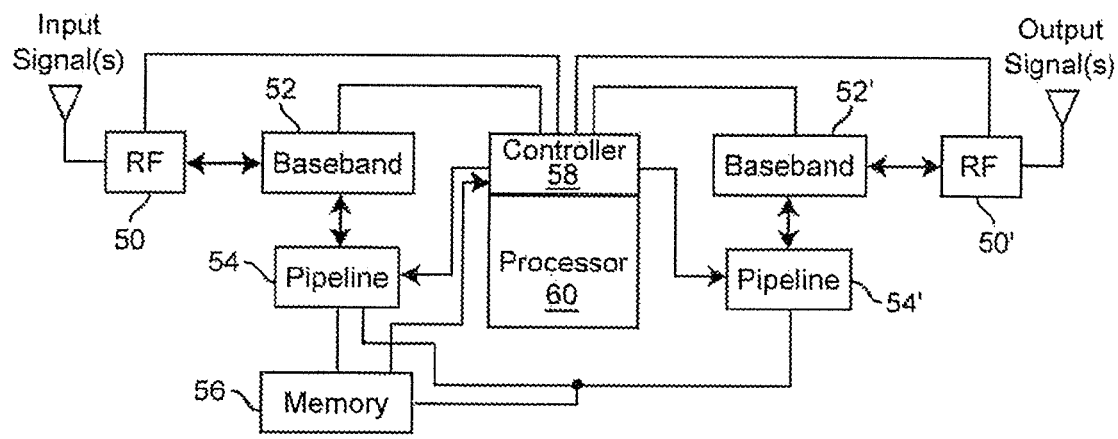
FIG. 5 illustrates an architectural diagram of the UWB repeater operation with security and filtering.

A key part of this invention, which is now described, is the data processing capabilities afforded by the UWB Repeater disclosed herein. FIG. 5 illustrates the architecture of the invention, which includes RF component 50 and 50', baseband component 52 and 52', pipeline component 54 and 54', memory 56, and a controller 58 with an integrated or separate processor component 60. Each of these architectural components may be used for both the received (incoming) and repeated (outgoing) signals, or may be replicated so that one set of components is used for the incoming side and one set of components is used for the output side. (e.g., see FIGS. 3 and 4 and alternate embodiments described). The pipeline, processing, control circuitry and memory may be the same entity (e.g. all contained within a microprocessor, a DSP engine, or microcontroller, for example), and it may also be the same physical circuit or chip chat also contains also the baseband and RF components. Alternatively, the memory (or any one of the other components, or combinations of components) may be in a separate chip or device. Note that the architectural components shown in FIG. 5 may be of a wide range of varieties and physical structures that may be on chip or on a separate chip or substrates, or may be distributed in different pieces of equipment or embedded in other components or circuit boards, or embedded in firmware, software, or operating system software, not shown explicitly. It is clear that multiple processors and multiple replications or parallel implementations of the embodiment shown in FIG. 5 may be practiced. Alternatively, the pipeline processors or memory (or other components) shown in FIG. 5 may actually be the same physical device, and may only require a single device for handling both input and output functions. While the architecture shown in FIG. 5 is a preferred embodiment, the functionality of the architecture, described below, may be implemented in alternate embodiments with varying approaches to providing the functional architecture, which are not meant to be excluded or limited herein. It should be clear that well-known signaling details, such as clock signals, analog and digital voltage sources, and power supplies, etc., while not explicitly shown in FIG. 5, are known to one of ordinary skill to be a required part of any functional device, and the sources of such signals could be provided in a distributed fashion or represented within any one of the architectural components during normal operation.

Figure 6:
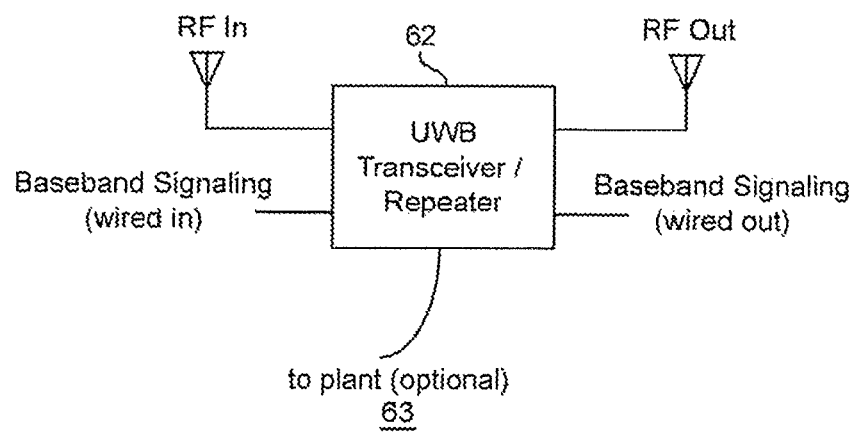
FIG. 6 illustrates the UWB repeater using combined RF and baseband signaling capabilities.

Note that the architecture of FIG. 5, when equipped with a sufficiently powerful baseband component 52 and 52', allows the UWB repeater to be used in a hybrid wireless-wireline network, where input signals may be applied directly to the baseband component 52, and output signals may be sent out the baseband component 52', for example, using standard Ethernet, DSL, ATM, SoNET, or other standard baseband signaling format. When implemented using parallel components (e.g. parallel baseband and pipeline functions or multithread processing or fast time slicing), the architecture of the invention allows for both RF UWB signals and baseband signals to be received at the input-side, and both RF and baseband signaling to be transmitted at the output-side, due to the fact that the baseband processor is able to implement both wireline PHY and MAC standards, as well as wireless UWB standards (or a universal PHY/MAC). This is shown in FIG. 6.

The ability to handle both wireless network and wired network traffic is a valuable capability, as it allows the disclosed UWB transceiver/repeater 62 to not only function in an all-wireless network, but allows it to be connected in a hybrid network, where wired devices and wireless devices may all be connected together through the invention, making it easier for the consumer to connect multiple devices in a home, for example, or to connect all devices (both wired and wireless) to a single plant connection 63 (an internet plug, for example) in the home (thus, the invention not only provides repeater functionality, but also itself may be connected to an Internet/DSL/Cable/Satellite/Wireless backbone plant or server). It is possible that both input signals at RF and input signals at baseband could arrive at the invention simultaneously, and may be properly processed and filtered and buffered and routed to provide network connectivity to other devices and the plant or server, as well as providing additional sources of data for traffic statistics, security, monitoring, and network maintenance chores. This architecture enables a low cost, flexible UWB repeater to serve as a junction box, connecting both wired and wireless devices to the same network, and optionally to the backbone plant, as well (See FIG. 6).

Figure 7:
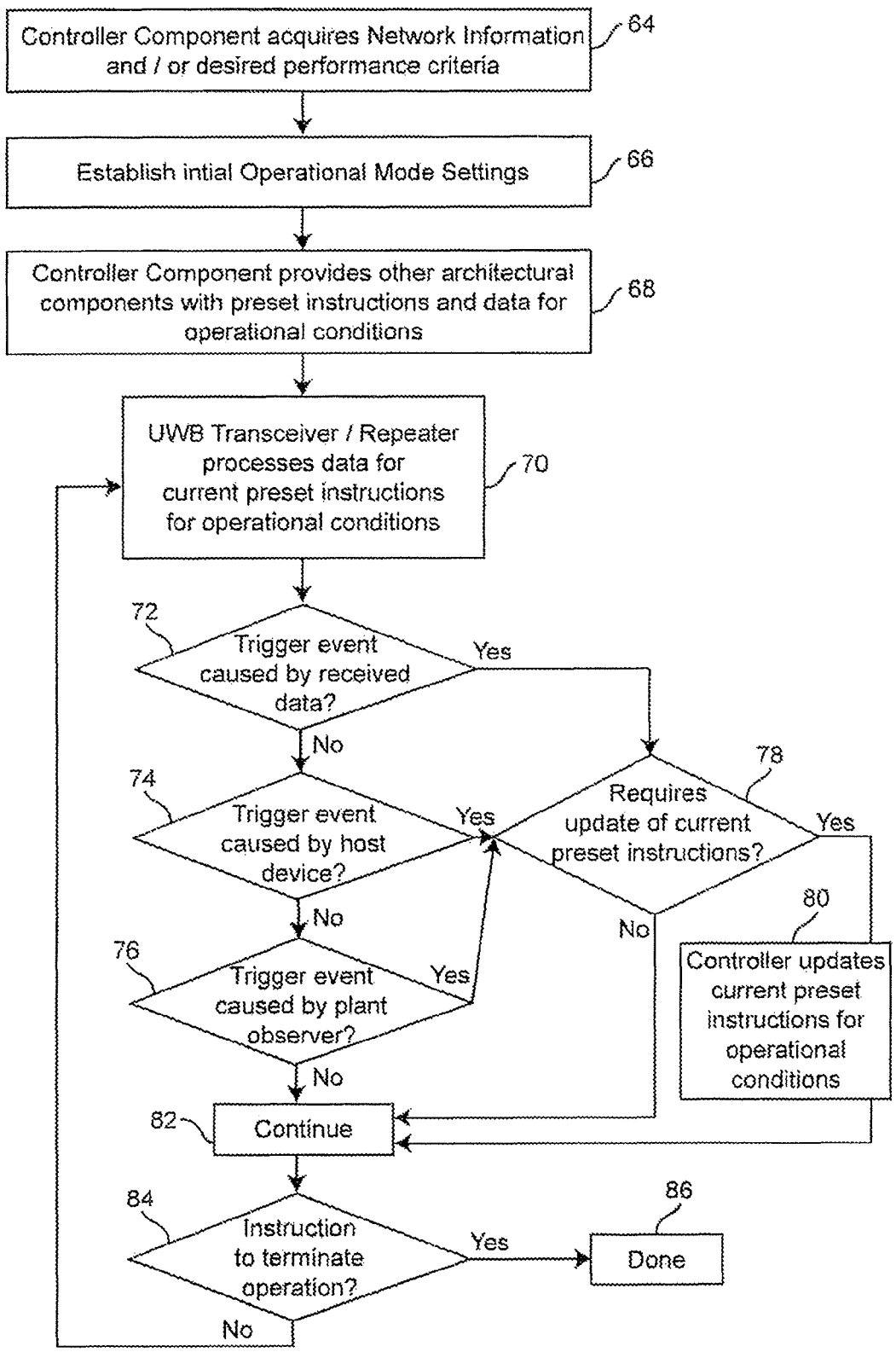
FIG. 7 illustrates a flow diagram of UWB repeater processing.

FIG. 7 shows a flow chart of the processing steps preferably performed by the invention, it being understood that the order of these steps may be varied. The controller component of the UWB Repeater/Transceiver architecture first acquires network information and/or desired performance criteria at step 64. That is to say, the controller component of the disclosed UWB repeater must be given explicit or implicit operating instructions, either from the plant, from the network itself, from one or more components in the network, from the owner or operator of the network, or from a rule-base developed from past history of the repeater itself, or from the particular device or devices the invention is intended to communicate with within the network. When embedded in a consumer electronic device, such as a PC, a car, or a home media center, the controller component may be accessed by a very simple user interface provided for the user, that allows the user to enter in one or more of a network ID (his or her own password or desired name, etc.), a listing of equipment to be configured, a count of equipment that they own, a listing of computer applications to be used in the network, a rough coverage area of particular wireless devices or components she wishes to have connected on the network, or other such data necessary to provide a rough guideline of the network operational characteristics desired by the user.

To be clear, however, an alternative embodiment would require no user interaction, as the home media device or the UWB repeater device itself may have a unique serial number ID associated with it, or may have some embedded data, or a table look up for a particular application, and this may be used (in connection with other data, such as provided by the plant) as the basis to launch transmissions in the network to detect and "train" all other UWB devices in the home network to assure they are properly connected to the network, all without any intervention or knowledge by the user.

Once it knows the "parameters" or "openness of the network" and knows the characteristics or ID's of those devices that "belong" on the wireless network, the controller component is able to then provide low-level instructions for the proper functioning of the UWB repeater. In this manner, the controller component establishes initial operation mode settings for the repeater at step 66, so that the busses are properly configured and the architectural components are preset to properly respond to various signals or conditions received from the UWB input-side, the plant, the wired network, or from the host device, etc. In other words, preset conditions (initial operation mode settings) may instruct the repeater to perform certain functions in a wide range of scenarios. For example, the initial operational mode settings may instruct the repeater to provide: (A) normal repeater functions (bent-pipe operation) with no storage functionality when the RF channel is clean and no spammer or interferer is detected at the input side of the UWB repeater, (B) to provide no repeater function when spam is detected, and (C) to report traffic statistics to the strongest or closest network component when a particular command is received over-the-air or on the baseband network. This is meant to simply illustrate the processing logic which is possible, and is merely a representative example not intended to limit the possible set of logic tables and condition mappings that are possible. It is clear that command and control logic can be created to provide sufficient flexibility and breadth of preset conditions. Further examples are given throughout the text below. It should be clear that for rapid flexibility and adaptability, preset conditions for several operational scenarios provides a low-overhead way of assuring the architectural components have access to the busses and to each other, in an efficient manner, when a key event (a trigger event) occurs due to a received signal or due to a need to transmit.

The controller component receives and sends electronic signals via one or more busses from one or more of the RF, baseband, memory, pipeline, and processor components. The controller has connection with the other components of the transceiver architecture, and facilitates instructions that may be read or written between each of the components over a bus (for example, I2C bus or new higher speed busses). Thus, communication of instructions and control signals and information may be written or read between the components, using either serial or parallel and unidirectional or bidirectional bus structures. The controller component is able to address each other component of the architecture within the UWB repeater, and then has the ability to read or write control data to each component as shown in step 68, in order to establish or learn operating conditions from the received input signals or plant, to instruct devices with preset instructions, or to provide instructions that have been established by the network or user or application that is being received or transmitted by the invention. The proper configuration and access to the busses is preprogrammed (preset) for specific operational instructions depending on the operational conditions encountered by the repeater. That is, each component, based on received signals and the computations performed during normal preset programmed operation which proceeds according to step 70, knows through preset instructions how it should send signals to the controller or to the other architectural components, for proper desired operation in various operational conditions.

A trigger event 72 occurs when there is a perceptible change or instruction, obtained through either the data received over the air on the UWB radio channel(s), or through the wired baseband network, or through instructions issued by the host unit housing the invention 74, or through data received from the plant 76. The order of these and possibly other trigger events caused by the repeater reacting to particular received data or host device, plant, or server instructions, could be different from that shown in FIG. 7. A trigger event may also occur when the transmitter is instructed or preprogrammed to transmit data (not shown in FIG. 7 flow diagram). Trigger events are due to signaling which is found to trip a condition or to signify a change in the current operation condition, or may occur due to preprogrammed, timing-based instructions previously instructed and preset by the controller component. Depending on the interpretation of the trigger event (performed by the controller architecture in conjunction with other architectural elements), the UWB repeater may simply continue to operate with the preset mode settings as originally programmed (with the same preset operational conditions), or a new course of action may need to be taken, in which the trigger event causes the controller architecture to consider providing new preset instructions for various operational conditions going forward.

The controller architecture determines at step 78 if such new preset instructions are needed, based on the computational results of the pipeline and processing components, in conjunction with memory, and may use one or more rule-based algorithms that tracks history, or may simply follow instructions specified by the network user, the host device, the plant, or the repeater itself. As described in more detail below, trigger events (e.g., 72, 74, 76, etc.) occur when there is a change in the network, and may be due to the reception of undesired data at the UWB input-side, undesired data on the baseband network, errant or counterfeited or spoofed ID's, watermarks, or a wide range of important conditions that indicate a change in network performance, the user's application, security conditions, signal or data integrity of desired transmissions, or the presence of jammers, hackers, or interferers.

As an example of how a trigger event may be detected, and to understand why the controller may wish to assign a different set of preset instructions for operational conditions going forward after a particular trigger event, consider the example of a UWB repeater functioning in a benign RF environment without interference. The device is receiving transmissions from desired in-network components and is retransmitting them, per the normal operational instructions. Now, assume a spammer or hacker attempts to jam or intrude on the network. The disclosed invention is able to detect the demodulated signal using the processing power pipeline processor in conjunction with memory and the processor, that the intruder is not a valid in-network component, and in fact may further check the intruder's ID or characteristics to find a match with an "unwanted" list of known attackers housed in memory. This detection of the intruder is a trigger event. Now, consider the case where the preset operational instructions simply called for the repeater to stop retransmitting the intruder's transmission when an intruder is detected. Now, because the hacker appeared on the "unwanted" list in memory, this intruder may be deemed to be a serious problem, in which case the controller architecture has the opportunity to alter the preset instructions for operational conditions going forward, as is done in step 80, and it may be advisable to now alert other devices and the host computer of the presence of the hacker whenever it is detected going forward. The new preset instructions passed from the controller component to the other architectural components may now be such that if the hacker transmission is identified again at the input-side of the repeater the repeater doesn't stop retransmitting (as before), but now the repeater rebroadcasts a warning message, an alert message, or a message to the network that instructs all other users of the hacker. It should be clear that various techniques known now or in the future to protect from spamming and to avoid unwanted intrusions may be incorporated into the invention using the processing techniques described here.

Using the system and method described here, network usage, network statistics, network provisioning information, or network security status for particular users, devices, applications, transmissions, or ID's would be known, measured or detected, and can be stored and communicated to a network server, another network component, a device controller, or through the plant using techniques known now or in the future.

The controller component updates the preset instructions for operational conditions at step 80, and provides actual control of RF and baseband signals, at a relatively slow rate (slow relative to the individual per-bit durations of the multi-megabit per second data rate received and sent by the invention over the air). Slow tasks for 100 Megabit per second data transmission for example, would require processing and control signaling on the order of a microsecond or so, as opposed to fast real-time data processing that would require speeds on the order of 10 nanoseconds or faster (such fast processing is handled by the pipeline and processing components, and the baseband and RF components). It should be clear that slow and fast are relative, and that this should in no way be limiting, since real time and "near" real time speeds shall change over time, application, and technology. Slow tasks handled by the controller component include enabling the adaptive signal processing, so that the initial antenna configurations may adapt to interference from a new transmitting source, or halting the transmission of an undesired signal, or the halting of spam over packet duration or multiple packet duration intervals (rather than bit duration intervals), or determining and invoking new instructions for operational conditions, or instructing memory or computation operations to begin or end, or instructing various warning or response messages or traffic statistics to be computed or reported. The actual computational chores invoked by these instructional messages by the controller architecture may happen at much faster rates. For example, the controller architecture is required to issue control signals to allow for antenna pointing, steering/phasing, MIMO adaptation to be invoked, and once the controller component enables this functionality to the appropriate architectural components, the on-going processing and signal manipulations and adaptations occur at much faster speeds.

The controller architecture provides preset instructions for operational conditions to various components, as well as enabling what operations they should perform ahead of time of the actual trigger event (e.g., the pipeline devices would be instructed the network ID or watermark to search for, or the particular error control coding or MAC or PHY that is to be used). The controller architecture also provides operational instructions to the memory, for gathering of data and statistics, as well as providing event-driven (trigger-driven) instructions for handling the gating of packets and data. Also, the controller allows the processor to communicate the results of its computations to other architectural components, or translates the results (with the aid of the processor) into control signals. Clearly, for implementing security features and software radio/antenna pointing chores, signal results must be detected and computational problems must be solved by the Pipeline and Processor components, as well as baseband and RF components, as described below, and the results of these solved computations must be used to continually drive the proper performance of the device without delays imposed by the controller component. The controller thus provides the initial and overall approval, and then simply facilitates the communication of such commands and instructions, and ensures the busses connecting the components are properly aligned for the specific tasks that need to occur for particular fast and slow processing and data passing chores.

As shown in FIG. 7, the UWB repeater continues to process in the manner described above, in a continual loop as shown in step 82, until an instruction to terminate operation is received as shown in step 84 (either received from a data source—wired or over the air, or from the plant, or the host device, or from the controller architecture, or the power supply is simply turned off to the device), at which point the processing is completed as noted in step 86

To describe the architecture of the invention in more detail, and to provide further examples to illuminate FIGS. 6 and 7, the following detailed description is useful.

Memory may take a wide range of forms as understood by those skilled in the art, including high speed RAM, DRAM, Flash chips, memory sticks, removable disks, etc, and this memory may be programmable, static, dynamic, random access, optically-processed, etc. such that vast amounts of data received at the input of the invention may at any time be stored, buffered, processed, interpreted, or retransmitted. The power required for the memory may be supplied by the same power supply that powers the processor and RF components, or it may be a separately provided DC or AC power supply, depending on the particular implementation or structure. For example, if the disclosed UWB Transceiver were embedded in a plug-in memory stick, it would likely receive power and data flows from the standard USB expansion slot, whereas if the invention were embedded within a PC or Media Entertainment Center, the pipeline processor, memory and UWB RF and baseband circuitry might be embedded in a chip or an assembly on the mother board of the PC, itself, thereby obtaining power from the internal PC supply. Memory is used by the present invention to store one or more of received data, forwarded data, to hold data strings or compressed versions of such strings needed by the controller or processor, to store execution instructions of the processor or controller, to store watermarks, identification data, (ID's), PHY or MAC instructions, other software radio instructions, calibration settings, table-look-up data for modulation, demodulation, coding, antenna pointing, antenna phasing, coding and decoding, processed data statistics, or any other data that needs to be stored and retrieved later. Memory may actually be comprised of different technologies, with different power levels, sizes, speeds, etc. whereas some part of memory is used for very fast storing and recalling, and the other part of memory is for longer term storage that does not have to be accessed very quickly.

The pipeline component processes data on a bit by bit or word by word basis, and thus has an extremely fast ability to process or make decisions on applied data. They have special architecture and house their own memory, and are designed specifically for rapid real-time data-streaming processing. The Pipeline component is able to implement real-time processing algorithms (such as coding, etc.) or compare or process inputted data to a preset pattern of data in a very streamlined, fast manner (e.g. it can function as a digital matched filter, or correlator, an error correction coder or decoder, a check sum counter, or provide other fast, bit-by-bit computational functions that provide very rapid processing typically required in broadband communications), thereby allowing the device to know whether patterns of data are properly tagged or apportioned. Stripping of headers in packets, finding ID's of words or bit-sequences in data streams, detecting or correcting bit errors, verifying or inserting watermarks in data transmissions, detecting security information, such as keys, passwords, handshake data, etc. are typical tasks performed by the Pipeline. The Controller is able to instruct the Pipeline component as to which data should be checked, and may also provide timing or observation interval information, as well.

Furthermore, the pipeline process is instructed to correct errors or insert ID's or watermarks or security data on transmissions, if it has been so instructed to by the controller. This is a powerful feature that allows the device to modify the data for retransmission in the network. For example, if the invention is used in a home network, a particular home network ID or watermark or key code may be assigned (inserted into the data) of all desired home network transmissions, and the Pipeline component on the input-side of the repeater may be instructed by the Controller to constantly search for this ID or watermark or key code to be received in order to determine the received signal is "desirable" or valid and that it should be repeated for retransmission. If errors occur, the invention may modify the received data stream for error correction. Alternatively, the network may need to change the watermark or ID or key code of the received data, and the invention is able to make such alterations to received data, and retransmit the altered data.

Also, the pipeline component may be constantly searching for "critical" or "unwanted" or bad transmissions, which have data streams, ID's, erroneous crypto words, or other identifying data segments or information that is stored or updated in memory and which can be compared to received data. Such critical or unwanted transmissions may be indicative of an attack or unwanted spam or an emergency reason to stop transmitting, and upon receipt of such data, the invention may, under previously set directions of the controller component, send an alarm message or urgent traffic message, or may send a message for network shutdown or device shutdown.

Depending on the type of network, the desired security, the particular protocol or common air interface, PHY, MAC, the particular watermark or ID, etc., it may be desired for the received signal to be immediately retransmitted (repeated) at the output-side of the repeater with minimal delay, in which case the controller would have directed the pipeline component to pass the data immediately to the baseband modulator on the output side of the repeater. (In this case, the pipeline components may have modified the data to correct errors, insert ID's, insert position or time stamp information, pass along network statistics or traffic/spam/utilization data, or other important network-specific data that is to be carried and repeated for the particular application or particular network implementation). This streamlined operation avoids delays in reading and writing to and from memory, and would provide an extremely fast retransmit time, while allowing modification or repair of received data. Alternatively, while the data is sent to the output-side, it may also be stored in the memory simultaneously (most likely through a memory pre-buffer that is used to capture all the data in parallel as it is sent to the transmitter, but with a sufficiently deep buffer that allows the transmitted data to be cached and stored to memory which operates at slower speeds than over-the-air RF transmissions—this is not shown but understood to one skilled in the art). Furthermore, the controller may have provided instructions to the pipeline device that upon one or more particular received data streams (for example, data streams that have been associated with Spam, peer-to-peer, or undesired transmissions, and which were stored in memory and earlier communicated to the pipeline device and stored there), the pipeline device is not connected directly to the baseband component of the output side, but instead the data passed by the pipeline component is stored directly to memory, or is simply ignored. In this manner, the invention is able to detect and filter unwanted RF data. The device may also have a reradiate mode, where received RF data stream is demodulated, pipelined, stored in memory or modified with a network ID, watermark, or counter, and then rebroadcast back to the originating RF source. This would be valuable for position location determination using time delay and/or signal strength measurement or prediction (as explained in many well known references, including work by Bahl, Rappaport, US Wireless, etc.), auditing of the network to determine how many devices are on the network, and with what ID's or watermarks or codes, determining propagation times, or used as part of a network throughput measurement scheme or traffic monitoring capability, etc.

The controller component thus works to ensure the Pipeline component and the memory and the Processor component, and the busses are properly configured to handle the desired chores. Received data is received at RF, demodulated at Baseband, and passed to the pipeline component, and the preprogrammed pipeline processing component thus works with the controller and the memory to either store (and not retransmit) the received data, store and forward (e.g. retransmit) the received data through the baseband and RF components on the output-side of the repeater, or alternatively the repeater may ignore the received data and not store it, or store the received data and retransmit it back to the originating source. Alternatively, the received data may be stored and retransmitted out of one or more antennas, including the antenna which originally received the received data. Furthermore, the data may be modified by the pipeline processing circuitry (or by the processor and memory) once its received, for example, to strip off unwanted or hostile data contained in the received data stream at the input of the repeater, or to add bit or packet changes in the packet data structure to implement ID or security or validation or bandwidth priority information in the repeated data which is radiated out of the repeater. Thus, the UWB repeater has the ability to monitor data which it receives, as well as to store it, forward it, return it, or modify it. All the while, the memory, working in conjunction with the processor, may use a different or same thread to build statistics and observe particular behaviors of the traffic, including the ability to sniff the packets and determine desired and undesired users, attacks on the home or vehicle or enterprise network. Thus modification of the MAC and IP layers, based on the flow of data or the availability of errors or desired QoS detected by the controller, is contemplated and capable with the invention.

It should be clear that the above description and following preferred embodiment emphasizes modification of a received signal and the associated processing steps prior to retransmission out of the UWB repeater. However, it should also be clear that similar functionality and capabilities may be achieved for the transmitted signal itself, where the same architectural components may be used to similarly process, modify, store, retransmit, or ignore signals that are otherwise intended to be sent to the output side of the device. Also, prepared messages or messages based on the computation of statistics or memory contents, messages based on alarms, network activity, the errors or transmissions or security breaches or ID's detected on the input-side of the repeater, or messages that are meant to synchronize for timing, positioning, or used to simply communicate the repeater's health, status, or alarm status (due to spamming or RF overload or interference, for example) may be sent by using the memory and based on results computed from the processor component or controller component. Such messages or data transmissions may be read out of memory, or processed through the pipeline component, passed to the baseband and RF components for transmissions to the output-side of the repeater. This enables the invention to provide beacon signals and messages regarding traffic, security, spam alert, alarm, position location, network use or, other preset messages for use in various applications, independent of the exact data being received at the moment by the input-side of the invention.

The capability of the UWB repeater to process and to modify the bit streams sent and received is powerful, as future security methodologies will rely on streamlined processing to implement rapid/dynamic key changes, dynamic network ID or watermark changes, and to allow authentication and validation. Emerging security standards, such as IEEE 802.11i, which use dynamic keys and strong codes, as well as EAP, 801.1X, GTPA, and future security techniques that may encompass both indoor and outdoor networks, will be able to be used by the disclosed invention, due to the capabilities of the processing and the modification capabilities of streams flowing in and out of the repeater. Furthermore, the repeater itself will be addressable on the personal area network, allowing the host/master "source" device, such as the office PC or TV console, to inquire, control, and to gather characteristics of piconet users, their traffic, attacks, throughput performance, coverage performance, or unintended or intended usage through the repeater. For example, the host could access the memory of the UWB repeater for detailed data, as well as collect statistics gathered and processed and stored by the UWB repeater, so that the human user of the network could gather a report of activity. Getting reports back from the UWB repeater can be done over the same Personal area network (PAN) that is used for wireless connectivity, or could be carried out using a wired network, if the invention happened to also be connected to a wired backbone, such as Cat-5 Cable (As described subsequently, the UWB repeater invention may have internet connection jacks that would allow it to also be connected to a wired infrastructure). Furthermore, without human intervention, the host could gather data from the UWB device, and use that knowledge for real time or near real time control for providing security, changes in security keys or protocols, changes in bandwidth provisioning, and could even provide a termination of the home network from the internet, in order to prevent the home network from being attacked or compromised.

The ability of the UWB repeater to process data and gather traffic and network conditions, including bandwidth provisioning data and security-related data, will be extremely useful in appliances that serve as in-home or in-office network controllers and interfaces, where the Internet is connected and then served wirelessly throughout a building. The UWB Repeater disclosed here would be fully compatible with RADIUS servers, and in fact could help provide the connectivity required for home devices to gain access to the Internet, as disclosed earlier. A web-enabled interface, or windows, or some other PC or Tivo/TV/VCR/Cable Modem/Satellite type programming interface could be supplied to program and control, as well as gather data from, the UWB repeater disclosed here.

The controller uses memory, such as flash, dram, PROM, and a wide range of other possibilities, based on speed, price, form factor and availability, to support the processing and buffer-and-forward operations. Coupled with the computational capabilities of the processor and pipeline components, and given the functionality of the baseband and RF compoents, one can readily see that a powerful network security capability can be implemented while simultaneously providing broader, reliable network coverage.

Consider one embodiment of the memory portion of this invention to be like today's Memory Sticks that currently have 60 MB of memory (but will have much more in the future) and plug into a PC port for power—the invention could have the same form factor, for example, as a plug in memory stick today, where the UWB repeater invention, including memory, is simply plugged into an access port on a PC or other home appliance. The UWB repeater, if in the form of a plug in "stick", could also enable the equipped device (which could be the source/host device, or some other device in the PAN) to connect via the UWB home network, while supporting the repeater operation within the PAN, while providing the capabilities of identifying the types of traffic and priorities which should be given such traffic within the PAN. Also, network management protocols and external devices and software, such as that located on the host PC, may query and retrieve the gathered data at the UWB repeater, and may adjust or control the UWB repeater processing modes (via the controller component) for particular desired network goals—such as greater security, more stringent prioritization on traffic, or even complete reboot/restart of processing in the UWB repeater. It is obvious to one skilled in the art that the UWB repeater could operate in concert with other devices, such as the host or other users of the Personal Area Network (e.g. home network) in order to provide distributed communication and command and control functions between the UWB repeater and other devices. In fact, it should be clear that the architectural structure of the UWB repeater may be distributed between hardware, embedded software, and an operating system which ships separately from the hardware, such as Windows or Linux, so that mass-produced UWB repeaters could be embedded or easily attached to existing appliances or computers.

The repeater may also have security provisioning such as an "authentication" or validation, as well as non-eradication function. Depending on the particular network scenario, network assignment steps can ensure the UWB repeater is being used to "repeat" signals from only those devices which are intended to be repeated within the home or office. This functionality could be done at layer 1 (PHY) with identification or authentication code sent over the air and detected by the Repeater, or performed at layer 2 (MAC) with handshake with other devices on the network, or a combination of layers being used for the security or authentication step, but this just as easily could be performed at higher layers, even performed up at the application layer (such as with VPN, web login, telephone dial, or some other computer-controlled authentication implemented automatically by one or more devices on the network, or implemented by the user on a software interface, computer program, web site, or data entry method that connects to the home/office UWB network). Also, just as today's IEEE 802.11 bridge/repeater products, the UWB repeater may be equipped with MAC address association control, and could easily have one or more integrated wired Ethernet port connections for use on a standard wired Ethernet connection (not shown in figures). These techniques are well understood by those knowledgeable in IEEE 802.11a/b/g and 802.15.3a/b standards activities, which have become widely popular in recent years, and the present invention, while not required by such standards, could implement such standards if the baseband and RF architectural components were properly configured to conform to the MAC and PHY standards.

Figure 8:
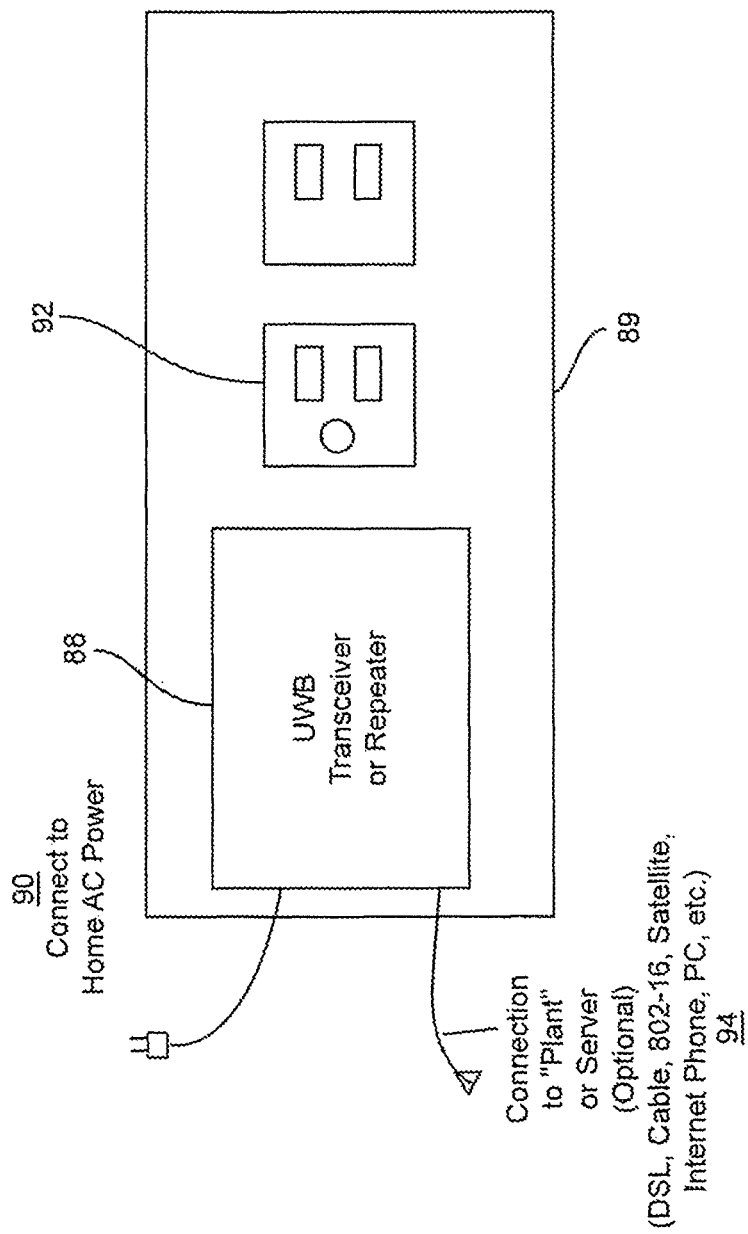
FIG. 8 illustrates the current invention as embedded in an AC outlet.

For example, a preferred embodiment of this invention has the UWB transceiver/repeater 88 be mounted in an AC outlet 90 for wall use or for barrier-strip extension cord 92 use (See FIG. 8). Alternatively, the device could be integrated in a consumer electronic device (a cellphone, or PC, or a home entertainment center, for example), and would be controlled by or interact with a software program running on a home computer or a game console or TV (a "host"). The host would allow the person using the home/business/vehicle network to type in or use a remote control or mouse device to connect his or her own home/office network, and the network would use UWB devices to communicate with each other to provide the network, and in doing this manual configuration, the user is able to input identifiers, such as product name or manufacturing codes or some other identifier of other appliances for the home network that the user is able to enter. This operation may also occur automatically, without manual intervention by the user, by the self-configuring Personal Area network "waking up" and reading the serial numbers/device codes through the airwaves automatically, and finding the UWB repeater.

Returning to the manual example of a home network appliance, in doing this data entry, the user is implicitly setting up security features which allow the myriad devices in the home to know they are on the desired network, and the UWB repeater is then able to know, through shared knowledge of this security information, which devices should be "repeated" and which devices (say from a neighboring building) should be "ignored" and not repeated. In this example, the UWB repeater could be embedded within the PC or cable TV product, or it could be communicated to wirelessly or via cable by the home computer or cable TV product, or it even could serve as the host, itself, where it is connected to the internet using wireless or wired means. Of course, one skilled in the art would understand the invention could also having no security or more limited security, where some or all messages within earshot would be repeated by the UWB repeater, or whereby some messages would not be repeated due to inherent knowledge of local devices and their valid signaling or data transmission. Also, it is clear that much simpler, automated, or built in configuration capabilities for specification of network parameters or operational conditions could be supplied, say within an operating system, or embedded in software or hard codes in a consumer device, itself.

In addition to security features disclosed above, the ability of the UWB Repeater to sense real-time data transmissions, such as network ID's or bit-streams associated with security or keys, allows any application to provide its own data coding, carried above the MAC and PHY layers, to enable particular desired features of network provisioning and bandwidth provisioning controls, so that some users (such as portable email or low rate data or low rate audio) are allocated some delay, or less important priority, in being retransmitted than are high priority data, such as video data or voice over IP telephony, or high bandwidth messaging or urgent information which has less tolerance to delay. This quality of service (QOS) intelligence could be identified within the MAC, PHY of standardized UWB equipment, but also can be inserted and detected by the disclosed invention when such signaling appears in the IP layer and/or other higher layers of the application data that is transmitted over the network. Thus, the invention allows electronics makers to create their own higher layer UWB protocol, or even a universal PHY and MAC layer, using standardized components, which also allows the UWB Repeater to prioritize and provision certain repeated data over other repeated data, by simply exploiting the fact that each UWB repeater device is able to detect actual data and can operate on such data using the architecture described above (see FIGS. 5 and 7). For example, data bits which alert the repeater and the network to the particular type of user/device can be used to help prioritize the UWB repeater's processing of the data which is to be repeated. In fact, the UWB repeater could be used in network test, where the memory and controlling circuits are used to induce a fixed, known, preset, or desired delay on particular traffic which is received by the repeater, in order to test "ringing of the network" or to determine if attackers or interference are correlated with the operation/transmissions of particular devices on the PAN.

The form factor of the UWB repeater may take on a wide range of sizes, shapes, and mounting/fixture options. This repeater could be installed or embedded in PCs, servers, or appliances, or it could be a stand alone device that could be purchased and placed in any home or office, embedded within a fire alarm, air freshener, night light, or phone. Alternatively, it could be a plug-in device, much like plug-in chassis cards are used today to enable WLAN access or modem access in PCs.

FIG. 8 illustrates a preferred embodiment of the invention, embedded within an AC Power strip. The AC strip could be built into the wall or purchased as an extension cord in hardware stores, etc. Note that the power strip has standard AC wiring to connect to the home or office AC power, but also has a connection to the "plant". This plant connection 94, which is optional in the practice of the invention, may be a physical connection, such as through a cable that connects the UWB transceiver to an Ethernet port, Cable TV outlet, DSL outlet, etc., or this port connection may be a wireless connection (for wireless access, the embedded UWB transceiver might be connected to a WiMax radio or Mesh Network transceiver, enabling wireless to come in to the UWB transceiver and be redistributed through the repeating function. Alternatively, the plant connection may be optional or unused, and the UWB transceiver simply implements the repeating and security functions described herein. This is an example of one of the myriad of form factors that can be used.

One could use the invention as part of AC extension cords, photocopiers, game consoles, television/video displays, video consoles, hospital video equipment, multimedia centers, air fresheners, fire alarms, etc. Fixtures, colors, shapes, and sizes may be very similar to fire alarms or air fresheners that plug into AC outlets in the home, or are wired into a car DC power supply, and the repeater device may also become embedded in objects that are typically carried around the home or office, such as but not excluding cordless phones, cell phones, portable computers, home stereos, TVs, pet collars, tennis shoes, and a wide range of portable, common devices that when moved could provide a wide array of range extension and coverage improvements of UWB devices. In fact, devices which integrate video, gaming, audio, and computing will likely benefit greatly from the disclosed invention. This invention may be a stand alone plug-in device, or may be embedded in AC outlets, receptacle extensions, and could become part of future phones or AC extension cords. The positioning and ranging capabilities of UWB make this applicable to tracking children and pets, or finding vehicles in large parking lots, as well.

It will be clear to one skilled in the art that the above disclosed invention may be applied in a wide range of applications and configurations as captured in the scope of the appended claims. Furthermore, the specification is not limited to a particular radio air interface standard or radio PHY or MAC definition or implementation.

I claim:

1. A networking method, comprising the steps of:
for a group of one or more wireless and/or wired devices, wherein said group can be enlarged or reduced by respectively adding or subtracting one or more devices from said group, providing at least one wireless repeater or relay comprising
  i) at least one receiver or transceiver for signal or data reception from one or more devices in said group, and at least one transmitter or transceiver for signal or data transmission to one or more devices of said group, wherein the transceiver for signal or data reception and the transceiver for signal or data transmission may be the same or different; and
  ii) a controller that is configured or configurable for operation in one or more wireless networks which include said group, wherein said controller controls processing of signals or data received by said at least one receiver or transceiver, said controller cooperating with said at least one receiver or transceiver to receive transmissions of one or more devices wherein said one or more devices either or both transmit and receive at an instantaneous or overall occupied bandwidth of 100 MHz or more or have a data transmission rate of 100 Megabits per second or more,
said at least one wireless repeater or relay and said one or more devices forming at least part of a network;
connecting said at least one wireless repeater or relay to one or more network backbones for connecting said one or more wireless networks with said one or more network backbones,
wherein said at least one wireless repeater or relay is used to support connectivity and/or position location capabilities for one or more mobile or portable devices, and
controlling said at least one wireless repeater or relay with said controller of said at least one wireless repeater or relay cooperating with said at least one receiver or transceiver which receives signals or data and said at least one transmitter or transceiver which transmits received, modified, stored, or delayed signals or data, to perform at least one of:
  a) ignoring or filtering out transmissions or data from one or more undesired transmitters, data sources, or noise sources;
  b) instructing one or more devices to ignore or disregard the transmissions or data of one or more undesired transmitters, undesired users or noise sources; and
  c) network provisioning or monitoring for one or more devices of said group, including one or more of: i) bandwidth or delay provisioning, ii) application prioritization, and iii) traffic, bandwidth, delay, or data transmission priorities for one or more devices of said group.

2. The networking method of claim 1, wherein at least one of said one or more network backbones to which said controller is connected in said connecting step is a wired backbone.

3. The networking method of claim 2, wherein said wired backbone is selected from a group consisting of T1, T3, DSL, cable, cable modem, fiber, optical cable, copper lines, coax, phone, ethernet, and internet.

4. The networking method of claim 1, wherein at least one of said one or more network backbones to which said controller is connected in said connecting step is a wireless backbone.

5. The networking method of claim 4, wherein said wireless backbone is selected from a group consisting of last mile wireless service, mesh network, LMDS, MMDS, WiMax, 802.16, 802.20, 802.11a/b/g, 802.15.3.a, RF, and baseband.

6. The networking method of claim 1, wherein said controller performs a).

7. The networking method of claim 1, wherein said controller performs b).

8. The networking method of claim 1, wherein said controller performs c).

9. The networking method of claim 1, wherein c) includes one or more of:
  i) bandwidth or delay provisioning of repeated or relayed transmissions,
  ii) prioritizing, delaying or altering of data transmissions, traffic, or bandwidth, and
  iii) monitoring or measuring traffic from one or more devices, users or networks.

10. The networking method of claim 1, further comprising a step of controlling said at least one wireless repeater or relay with said controller of said at least one wireless repeater or relay cooperating with said at least one receiver or transceiver which receives signals or data and said at least one transmitter or transceiver which transmits received, modified, stored, or delayed signals or data, to perform a plurality of a), b), and c).

11. The networking method of claim 1, further comprising a step of controlling said at least one wireless repeater or relay with said controller of said at least one wireless repeater or relay cooperating with said at least one receiver or transceiver which receives signals or data and said at least one transmitter or transceiver which transmits received, modified, stored, or delayed signals or data, to perform all of a), b), and c).

12. The networking method of claim 1, wherein said network includes at least one wired link.

13. The networking method of claim 1, further comprising a step of updating instructions in said controller of said at least one wireless repeater or relay which are implemented in said providing and controlling steps.

14. The networking method of claim 1, wherein said network information includes one or more of: IDs or operating characteristics for each of the components to be used in said network, or IDs or operating characteristics for one or more users permitted to be used in said network.

15. The networking method of claim 1, wherein said network information includes one or more of: a specified coverage area for one or more wireless devices to permit use of said network, or specified applications permitted to be used in said network.

16. The networking method of claim 1, further comprising a step of storing in a buffer memory received or to be transmitted signals or data for processing by said controller.

17. The networking method of claim 1, wherein at least one of said one or more devices in said group are located in an automobile or aircraft.

18. The networking method of claim 1, wherein said at least one wireless repeater or relay is associated or associable with one or more of: an AC outlet or extension cord, a room fixture, a connection port, a display terminal, a gaming device, an office or home, a night light, a fire alarm, a ceiling fixture, a wall fixture, a human-wearable or petwearable device, a computer, a television or video console, a plug-in device, a vehicle, a train, an airplane, a fixed or portable/mobile phone, a moving platform, a computer, a router, a server, or a consumer electronic device.

19. The networking method of claim 1, wherein said at least one receiver or transceiver and at least one transmitter or transceiver may be separate components or combined as one or more receivers, transmitters, or transceivers.

20. The networking method of claim 1, further comprising the step of identifying, using said controller, at least one of said one or more wireless and/or wired devices in said group.

21. The networking method of claim 1, wherein said controller is either pre-programmed or programmable to monitor traffic characteristics or security characteristics related to received and transmitted signals or data, at least some of which are received from or sent to said one or more devices in said group.

22. The networking method of claim 21, wherein said traffic characteristics includes one or more of: a) reception strength or quality of one or more wireless devices used in said group, b) applications used by one or more devices in said group; or c) protocols, data transmission rates, or air interface characteristics of one or more devices in said group.

23. The networking method of claim 21, wherein said traffic characteristics or security characteristics are used by said at least one wireless repeater or relay to provide improvements in one or more of: network coverage, network performance, network security, traffic filtering, device addressability, suppression of the retransmission of unwanted signals or data, device configuration, connectivity, interference mitigation, spectrum utilization, battery/power utilization, application prioritization, setting up of schedules or priorities of transmissions, determining or setting up delays, or setting up of protocols or data transfer mechanisms.

24. The networking method of claim 1, wherein providing said at least one wireless repeater or relay includes the step of providing, with said controller, the collecting, reporting, or storing of network usage and network statistics.

25. The networking method of claim 1, wherein said at least one wireless repeater or relay is of a form factor that is either stand-alone, plug-in, embedded, integrated, distributed over one or more devices, included within a network connection port, or integrated as part of a) a vehicle or moving platform, b) a server, router, computer, cellphone or portable consumer electronic device; or c) a home or office environment or appliance, or d) an aircraft.

26. The networking method of claim 1, where wireless transmission or reception by at least one of said one or more wireless devices or said at least one wireless repeater or relay is performed using one or more adaptive antennas that are either steerable, phased, or which use MIMO.

27. The networking method of claim 26, wherein said group has an improvement of one or more of: network coverage, network performance, network security, traffic filtering, device addressability, suppression of the retransmission of unwanted signals or data, device configuration, connectivity, interference mitigation, spectrum utilization, battery/power utilization, application prioritization, setting up of schedules or priorities of transmissions, determining delays, or setting up of protocols or data transfer mechanisms provided by said controller of said at least one wireless repeater or relay in said providing step.

28. The networking method of claim 1, wherein said group has improved network security, network management, network performance, or interference management provided by said controller of said at least one wireless repeater or relay in said providing step.

29. The networking method of claim 1, further comprising the step of using the controller to provide position location information for at least one of said one or more devices or at least one of said at least one wireless repeater or relay in said group.

30. The networking method of claim 1, wherein said at least one receiver and said at least one transmitter operate in half duplex.

31. The networking method of claim 1, wherein said at least one receiver and said at least one transmitter operate in full duplex.

32. The networking method of claim 1, wherein said at least one receiver and said at least one transmitter operate in simplex.

33. The networking method of claim 1, wherein at least one of said one or more devices has a higher data rate than if said at least one wireless repeater or relay was not present in said group.

34. The networking method of claim 1, wherein at least one of said one or more devices has a greater coverage distance than if said at least one wireless repeater or relay was not present in said group.

35. The networking method of claim 1, wherein at least one of said one or more devices have higher quality of transmission or reception than if said at least one wireless repeater or relay was not present in said group.

36. The networking method of claim 1, wherein at least one of said one or more devices has less interference than if said at least one wireless repeater or relay was not present in said group.

37. The networking method of claim 1, wherein at least one of said one or more wireless networks has an improved ability to control its capacity than if said at least one wireless repeater or relay was not present in said group.

38. The networking method of claim 1, wherein said controller is configured to modify received data or transmissions.

39. The networking method of claim 1, wherein said controller is configured to cause said one or more transmitters or transceivers to transmit modified received data or transmissions to one or more devices.

40. The networking method of claim 1, wherein said at least one wireless repeater or relay employs MIMO or adaptive antenna technology.

41. The networking method of claim 1, wherein said controller is self-configurable.

42. The networking method of claim 1, wherein at least one of said one or more wireless networks is in an in-vehicle environment and said controller is configurable for operation in said in-vehicle environment.

43. The networking method of claim 1, wherein at least one of said one or more wireless networks is in an indoor environment and said controller is configurable for operation in said indoor environment.

44. The networking method of claim 1, wherein at least one of said one or more wireless networks is in an outdoor environment and said controller is configurable for operation in said outdoor environment.

45. The networking method of claim 1, wherein at least one of said one or more wireless networks is a cellular network and said controller is configurable for operation in said cellular network.

46. The networking method of claim 1, wherein said one or more devices are selected from television, telephone, cellphone, repeater, computer, camera, video system, airplane, monitor, power plug or wall outlet, watch, Cable modem, vehicle, game console, and transceiver.

47. The networking method of claim 1, wherein said controller is embedded into an integrated circuit chip which is insertable into said one or more devices.

48. The networking method of claim 1, wherein said controller and one or more of said at least one receiver or transceiver for signal or data reception and said at least one transmitter or transceiver for signal or data transmission are integrated.

49. A network, comprising:
a group of devices, at least some of said devices in said group configured for communication with other devices in said group, wherein said devices of said group comprise one or more broadband wireless repeaters or relays,
wherein at least one of said one or more broadband wireless repeaters or relays comprise:
  at least one receiver or transceiver for signal or data reception from one or more devices in said group;
  at least one transmitter or transceiver for signal or data transmission to one or more devices of said group,
  wherein the transceiver for signal or data reception and the transceiver for signal or data transmission may be the same or different; and
  a controller that is configured or configurable for operation in one or more wireless networks, said controller communicating with said at least one receiver or transceiver for signal or data reception and said at least one transmitter or transceiver for signal or data transmission,
wherein at least one of said receiver or transceiver for signal or data reception and said transmitter or transceiver for signal or data transmission either or both transmit and receive at an instantaneous or overall occupied bandwidth of 100 MHz or more or that have a data transmission rate of 100 Megabits per second or more,
wherein said at least one of said one or more broadband wireless repeaters or relays is connected or connectable to one or more network backbones for connecting said one or more wireless networks with said one or more network backbones, and
wherein said at least one of said one or more broadband wireless repeaters or relays is used to support connectivity and/or position location capabilities for one or more mobile or portable devices,
wherein said controller is configured or configurable to perform or for performing at least one of:
  a) ignore or filter out at least some signal or data transmissions from one or more undesired transmitters, users, networks, data sources, or noise sources;
  b) instruct one or more devices or networks to ignore or disregard at least some signal or data transmissions of one or more undesired transmitters, undesired users, undesired networks, or noise sources; and
  c) network provisioning or monitoring, wherein said network provisioning or monitoring includes one or more of:
    i) bandwidth or delay provisioning of repeated or relayed transmissions,
    ii) application prioritization,
    iii) prioritizing, delaying or altering of data transmissions, traffic, or bandwidth, and
    iv) monitoring or measuring traffic from one or more devices, users or networks.

50. The network of claim 49, wherein at least one of said one or more network backbones to which said controller is connected or connectable is a wired backbone.

51. The network of claim 49, wherein said controller performs a).

52. The network of claim 49, wherein said controller performs b).

53. The network of claim 49, wherein said controller performs c).

54. The network of claim 50, wherein said wired backbone is selected from a group consisting of T1, T3, DSL, cable, cable modem, fiber, optical cable, copper lines, coax, phone, ethernet, and internet.

55. The network of claim 49, wherein said controller is configured or configurable to perform or for performing a plurality of a), b), and c).

56. The network of claim 49, wherein said controller is configured or configurable to perform or for performing all of a), b), and c).

57. The network of claim 49, wherein said at least one receiver or transceiver for receiving signals or data and said at least one transmitter or transceiver for transmitting signals or data operate in half duplex.

58. The network of claim 49, wherein said at least one receiver or transceiver for receiving signals or data and said at least one transmitter or transceiver for transmitting signals or data operate in full duplex.

59. The network of claim 49, wherein said at least one receiver or transceiver for receiving signals or data and said at least one transmitter or transceiver for transmitting signals or data operate in simplex.

60. The network of claim 49, wherein said at least one of said one or more broadband wireless repeaters or relays is configured such that when in a network which includes one or more devices which can transmit or receive at an instantaneous or overall occupied bandwidth of 100 MHz or more or have a data transmission rate of 100 Megabits per second or more at least one of said one or more devices has a higher data rate than if said at least one of said one or more broadband wireless repeaters or relays was not present in said network.

61. The network of claim 49, wherein said at least one of said broadband wireless repeaters or relays is configured such that when in a network which includes one or more devices which can transmit or receive at an instantaneous or overall occupied bandwidth of 100 MHz or more or have a data transmission rate of 100 Megabits per second or more at least one of said one or more devices has a greater coverage distance than if said at least one of said one or more broadband wireless repeaters or relays was not present in said network.

62. The network of claim 49, wherein said at least one of said one or more broadband wireless repeaters or relays is configured such that when in a network which includes one or more devices which can transmit or receive at an instantaneous or overall occupied bandwidth of 100 MHz or more or have a data transmission rate of 100 Megabits per second or more at least one of said one or more devices have higher quality of transmission or reception than if said at least one of said broadband wireless repeaters or relays was not present in said network.

63. The network of claim 49, wherein said at least one of said one or more broadband wireless repeaters or relays is configured such that when in a network which includes one or more devices which can transmit or receive at an instantaneous or overall occupied bandwidth of 100 MHz or more or have a data transmission rate of 100 Megabits per second or more at least one of said one or more devices has less interference than if said at least one of said one or more broadband wireless repeaters or relays was not present in said network.

64. The network of claim 49, wherein said at least one of said broadband wireless repeaters or relays is configured such that when in one or more wireless networks which includes one or more devices which can transmit at an instantaneous or overall occupied bandwidth of 100 MHz or more or have a data transmission rate of 100 Megabits per second or more at least one of said one or more wireless networks has an improved ability to control its capacity than if said at least one of said one or more broadband wireless repeaters or relays was not present in said one or more wireless networks.

65. The network of claim 49, wherein said signals or data received by said receiver or transceiver for receiving signals or data, or signals or data transmitted by said transmitter or transceiver for transmitting signals or data, or signals or data controlled by said controller include modified, stored, or delayed signals or data.

66. The network of claim 49, wherein said controller is configured to cause said at least one transmitter or transceiver for transmitting signals or data to transmit modified received data or transmissions to one or more devices at an instantaneous or overall occupied bandwidth of 100 MHz or more or have a data transmission rate of 100 Megabits per second or more.

67. The network of claim 49, wherein said controller is configured to identify one or more devices in said one or more wireless networks.

68. The network of claim 49, wherein said at least one of said one or more broadband wireless repeaters or relays employs MIMO or adaptive antenna technology.

69. The network of claim 49, wherein said controller is self-configurable.

70. The network of claim 49, wherein at least one of said receiver or transceiver for signal or data reception, at least one of said transmitter or transceiver for signal or data transmission, or said controller is configured for operation in at least one of said one or more wireless networks in a moving platform environment.

71. The network of claim 49, wherein said at least one of said one or more broadband wireless repeaters or relays is configured to be integrated with or in communication with a vehicle, train, aircraft, or other moving platform.

72. The network of claim 49, wherein at least one of said receiver or transceiver for signal or data reception, at least one of said transmitter or transceiver for signal or data transmission, or said controller is configured for operation in at least one of said one or more wireless networks in an indoor environment.

73. The network of claim 49, wherein at least one of said receiver or transceiver for signal or data reception, at least one of said transmitter or transceiver for signal or data transmission, or said controller is configured for operation in at least one of said one or more wireless networks in an outdoor environment.

74. The network of claim 49, wherein at least one of said receiver or transceiver for signal or data reception, at least one of said transmitter or transceiver for signal or data transmission, or said controller is configured for operation in at least one of said one or more wireless networks selected from the group consisting of: a cellular network, an enterprise network, a wireless local area network, or a wireless personal area network.

75. The network of claim 49, wherein said at least one of said one or more broadband wireless repeaters or relays is configured to be integrated with or in communication with a device selected from the group consisting of a television, a telephone, a cellphone, a computer, a camera, a video system, a monitor, a power plug, a wall outlet, a watch, a cable modem, a vehicle or other moving platform, a game console, and an ultrawideband transceiver or device.

76. The network of claim 49, wherein one or more of said receiver or transceiver for signal or data reception, said transmitter or transceiver for signal or data transmission, and said controller is embedded in one or more integrated circuit chips.

77. The network of claim 49, wherein said at least one of said one or more broadband wireless repeaters or relays is configured or configurable for monitoring or measuring traffic passed through, received by or transmitted by said at least one of said one or more broadband wireless repeaters or relays.

78. The network of claim 49, wherein said at least one of said one or more broadband wireless repeaters or relays is configured or configurable to modify at least some received signals or data from one or more devices, users or networks and to transmit modified or delayed signals or data to at least one device, network or user via wireless communication.

79. The network of claim 49, wherein said controller and one or more of said at least one receiver or transceiver for signal or data reception and said at least one transmitter or transceiver for signal or data transmission are integrated.

80. The network of claim 49, wherein at least one of said one or more network backbones to which said controller is connected or connectable is a wireless backbone.

81. The network of claim 80, wherein said wireless backbone is selected from a group consisting of last mile wireless service, mesh network, LMDS, MMDS, WiMax, 802.16, 802.20, 802.11a/b/g, 802.15.3.a, RF, and baseband.

82. A networking method, comprising the steps of:
for a group of one or more wireless and/or wired devices, wherein said group can be enlarged or reduced by respectively adding or subtracting one or more devices from said group, providing at least one wireless repeater or relay comprising
 i) at least one receiver or transceiver for signal or data reception from one or more devices in said group, and at least one transmitter or transceiver for signal or data transmission to one or more devices of said group, wherein the transceiver for signal or data reception and the transceiver for signal or data transmission may be the same or different; and
 ii) a controller that is configured or configurable for operation in one or more wireless networks which include said group, wherein said controller controls processing of signals or data received by said at least one receiver or transceiver, said controller cooperating with said at least one receiver or transceiver to receive transmissions of one or more devices wherein said one or more devices either or both transmit and receive at an instantaneous or overall occupied bandwidth of 100 MHz or more or have a data transmission rate of 100 Megabits per second or more,
said at least one wireless repeater or relay and said one or more devices forming at least part of a network;
connecting said at least one wireless repeater or relay to one or more network backbones for connecting said one or more wireless networks with said one or more network backbones, wherein said at least one wireless repeater or relay is used to support connectivity and/or position location capabilities for one or more mobile or portable devices, wherein said providing said at least one wireless repeater or relay step includes a step of programming said at least one wireless repeater or relay with at least one of:
- a) network information which identifies at least one of said one or more devices in said group;
- b) desired or target performance criteria or coverage area for at least one of the wireless devices in said group;
- c) security information pertinent to at least one of said one or more devices in said group; and
- d) protocol information or air interface definitions for at least one of said one or more devices in said group.

83. The networking method of claim 82, wherein said step of programming is performed either manually or automatically using information that is provided using one or more of: i) local memory, ii) wireless or wired communications, iii) remote or distributed memory, iv) software or hardware from a different device, or v) the internet.

84. The networking method of claim 82, wherein said controller controls the processing of signals or data by said at least one receiver or transceiver from both of at least one of said one or more devices and at least one of said at least one wired link, or transmission by said at least one transmitter or transceiver to both of at least one of said one or more devices and at least one of said at least one wired link.

85. A networking method, comprising the steps of:
for a group of one or more wireless and/or wired devices, wherein said group can be enlarged or reduced by respectively adding or subtracting one or more devices from said group, providing at least one wireless repeater or relay comprising
- i) at least one receiver or transceiver for signal or data reception from one or more devices in said group, and at least one transmitter or transceiver for signal or data transmission to one or more devices of said group, wherein the transceiver for signal or data reception and the transceiver for signal or data transmission may be the same or different; and
- ii) a controller that is configured or configurable for operation in one or more wireless networks which include said group, wherein said controller controls processing of signals or data received by said at least one receiver or transceiver, said controller cooperating with said at least one receiver or transceiver to receive transmissions of one or more devices wherein said one or more devices either or both transmit and receive at an instantaneous or overall occupied bandwidth of 100 MHz or more or have a data transmission rate of 100 Megabits per second or more, said at least one wireless repeater or relay and said one or more devices forming at least part of a network;
connecting said at least one wireless repeater or relay to one or more network backbones for connecting said one or more wireless networks with said one or more network backbones, wherein said at least one wireless repeater or relay is used to support connectivity and/or position location capabilities for one or more mobile or portable devices, wherein said controller is either pre-programmed or programmable to monitor traffic characteristics or security characteristics related to received and transmitted signals or data, at least some of which are received from or sent to said one or more devices in said group, and wherein said security characteristics includes one or more of: IDs or operating characteristics for each of the components to be used in said network, or IDs or operating characteristics for one or more users permitted to be used in said network.

86. A networking method, comprising the steps of:
for a group of one or more wireless and/or wired devices, wherein said group can be enlarged or reduced by respectively adding or subtracting one or more devices from said group, providing at least one wireless repeater or relay comprising
- i) at least one receiver or transceiver for signal or data reception from one or more devices in said group, and at least one transmitter or transceiver for signal or data transmission to one or more devices of said group, wherein the transceiver for signal or data reception and the transceiver for signal or data transmission may be the same or different; and
- ii) a controller that is configured or configurable for operation in one or more wireless networks which include said group, wherein said controller controls processing of signals or data received by said at least one receiver or transceiver, said controller cooperating with said at least one receiver or transceiver to receive transmissions of one or more devices wherein said one or more devices either or both transmit and receive at an instantaneous or overall occupied bandwidth of 100 MHz or more or have a data transmission rate of 100 Megabits per second or more, said at least one wireless repeater or relay and said one or more devices forming at least part of a network;
connecting said at least one wireless repeater or relay to one or more network backbones for connecting said one or more wireless networks with said one or more network backbones, wherein said at least one wireless repeater or relay is used to support connectivity and/or position location capabilities for one or more mobile or portable devices, wherein said controller is either pre-programmed or programmable with network information, wherein said controller operates in conjunction with at least one processor in order to pass, ignore, reject, redirect, modify, delay, or kill at least some of said signals or data in order to differentiate between desired or undesired signals or data or to prioritize data flows for improved network security, network management, network performance, or interference management for the individual or collective benefit of one or more of said one or more devices within said group.

* * * * *